(12) United States Patent
Li

(10) Patent No.: US 12,361,594 B2
(45) Date of Patent: Jul. 15, 2025

(54) IMAGE PROCESSING METHOD AND APPARATUS, COMPUTER DEVICE AND STORAGE MEDIUM

(71) Applicant: TENCENT TECHNOLOGY (SHENZHEN) COMPANY LIMITED, Shenzhen (CN)

(72) Inventor: Yuexin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 301 days.

(21) Appl. No.: 17/968,575

(22) Filed: Oct. 18, 2022

(65) Prior Publication Data

US 2023/0041573 A1 Feb. 9, 2023

Related U.S. Application Data

(63) Continuation of application No. PCT/CN2022/082081, filed on Mar. 21, 2022.

(30) Foreign Application Priority Data

Mar. 23, 2021 (CN) .......................... 202110309206.2

(51) Int. Cl.
*G06T 5/00* (2024.01)
*G06T 7/00* (2017.01)
*G06T 7/90* (2017.01)

(52) U.S. Cl.
CPC .............. *G06T 5/00* (2013.01); *G06T 7/0002* (2013.01); *G06T 7/90* (2017.01); *G06T 2207/10024* (2013.01); *G06T 2207/30201* (2013.01)

(58) Field of Classification Search
CPC ... G06T 5/00; G06T 7/0002; G06T 7/90; G06T 2207/10024; G06T 2207/30201;
(Continued)

(56) References Cited

U.S. PATENT DOCUMENTS

2006/0008112 A1* 1/2006 Reed ..................... G06T 1/0085
382/100
2006/0215924 A1* 9/2006 Steinberg ............. H04N 5/2628
348/222.1
(Continued)

FOREIGN PATENT DOCUMENTS

CN 101609500 A 12/2009
CN 111241895 A 6/2020
(Continued)

OTHER PUBLICATIONS

The World Intellectual Property Organization (WIPO) International Search Report for PCT/CN2022/082081 May 26, 2022 6 Pages (including translation).

*Primary Examiner* — Ali Bayat
(74) *Attorney, Agent, or Firm* — ANOVA LAW GROUP PLLC

(57) ABSTRACT

Disclosed are an image processing method and apparatus, a computer device and a storage medium, which relate to the field of artificial Intelligence. The method includes receiving an original image; performing image photographing defect detection and color deviation detection on the original image, the image photographing defect detection determining whether there exists a photographing defect that is irreparable through image processing, the color deviation detection determining whether there exists color cast in the original image; performing color correction on the original image if the original image passes the image photographing defect detection and does not pass the color deviation (Continued)

detection; and generating a target image based on the color-corrected original image.

16 Claims, 11 Drawing Sheets

(58) Field of Classification Search
CPC . G06T 2207/30168; G06T 3/04; G06V 10/24; G06V 10/56; G06V 10/60; G06V 40/161
USPC .......................................................... 382/100
See application file for complete search history.

(56) References Cited

U.S. PATENT DOCUMENTS

| | | | |
|---|---|---|---|
| 2009/0034837 A1* | 2/2009 | Kato ......................... | G06T 5/40 382/167 |
| 2010/0028619 A1* | 2/2010 | Ko ....................... | B42D 25/369 428/354 |
| 2010/0054533 A1* | 3/2010 | Steinberg ............... | H04N 23/84 382/103 |
| 2012/0133753 A1* | 5/2012 | Chang .................... | G06V 40/16 382/190 |
| 2015/0186373 A1 | 7/2015 | Pierre et al. | |
| 2018/0350048 A1* | 12/2018 | Tada ........................ | G06T 5/50 |

FOREIGN PATENT DOCUMENTS

| | | |
|---|---|---|
| CN | 111814569 A | 10/2020 |
| CN | 112507923 A | 3/2021 |

* cited by examiner

IMAGE PROCESSING METHOD AND APPARATUS, COMPUTER DEVICE AND STORAGE MEDIUM

RELATED APPLICATIONS

This application is a continuation of PCT Application No. PCT/CN2022/082081 filed on Mar. 21, 2022, which claims priority to Chinese Patent Application No. 202110309206.2, entitled "IMAGE PROCESSING METHOD AND APPARATUS, COMPUTER DEVICE AND STORAGE MEDIUM" filed on Mar. 23, 2021. The two applications are incorporated by reference in their entirety.

FIELD OF THE TECHNOLOGY

Embodiments of this application relate to the field of artificial Intelligence, and in particular, to an image processing method and apparatus, a computer device, and a storage medium.

BACKGROUND OF THE DISCLOSURE

An identity photo is a photo used for verifying identity on various certificates, such as an identity card, a driver's license, a degree certificate, and the like, which all need the identity photo for identity verification.

There are many requirements for the identity photo on, for example, clothing, posture, size, and the like, and the requirements are different for different identity photos. Due to strict requirements for the identity photo, a user often takes a photo at a certain location, for example, a photo studio, or takes a photo by using a self-service photographing machine, to obtain a required identity photo.

However, taking a photo at a certain location is a cumbersome process. A photo taken by using a self-service photographing machine needs to be finished in a fixed environment and with a fixed user posture. Since self-service photographing is completed by the user, a captured image also may not meet the standard required for the photo, thereby causing a low success rate of an identity photo verification.

SUMMARY

Embodiments of this application provide an image processing method and apparatus, a computer device, and a storage medium. A technical solution is as follows:

One aspect of this application provides an image processing method performed by a computer device. The method includes receiving an original image; performing image photographing defect detection and color deviation detection on the original image, the image photographing defect detection determining whether there exists a photographing defect that is irreparable through image processing, the color deviation detection determining whether there exists color cast in the original image; performing color correction on the original image if the original image passes the image photographing defect detection and does not pass the color deviation detection; and generating a target image based on the color-corrected original image.

Another aspect of this application provides an image processing method performed by a computer device. The method includes displaying a photographing interface; receiving an original image after photographing in response to a trigger operation on a photographing control in the photographing interface; displaying photographing specification prompt information when the original image does not pass image photographing defect detection, the image photographing defect detection determining whether there exists a photographing defect in the original image, the photographing defect referring to a defect that is irreparable through image processing, the photographing specification prompt information comprising the photographing defect existing in the original image; performing color correction on the original image when the original image passes the image photographing defect detection and does not pass a color deviation detection, the color deviation detection determining whether there exists color cast in the original image; and displaying the color-corrected original image after the color correction process.

Another aspect of this application provides a non-transitory computer-readable storage medium, the readable storage medium storing at least one instruction, at least one program, a code set, or an instruction set, the at least one instruction, the at least one program, the code set, or the instruction set being loaded and executed by a processor to implement the image processing method described in the foregoing aspects.

In the embodiments of this application, after obtaining the original image, the image photographing defect detection and the color deviation detection are performed on the original image. First, whether there exists the photographing defect that is irreparable in the image can be detected through the image photographing defect detection, so that the user may be guided to perform appropriate photographing based on a detection result subsequently. Further, whether there exists the color cast in the original image can be detected through the color deviation detection. If the color cast exists, the color correction is performed automatically, and the target image is generated based on the original image after the correction, which may improve the quality of the target image, thereby helping improve the verification success rate of the target image. The automatic color correction can also reduce learning costs of the user and help improve the verification success rate of an image photographed by the user in any scenario. In addition, performing the color correction on the original image that passes the image photographing defect detection and does not pass the color deviation detection can avoid the inefficient color correction process performed on the original image that does not pass the image photographing defect detection, thereby reducing the waste of the computing power of the devices.

DESCRIPTION OF EMBODIMENTS

Figure 1:
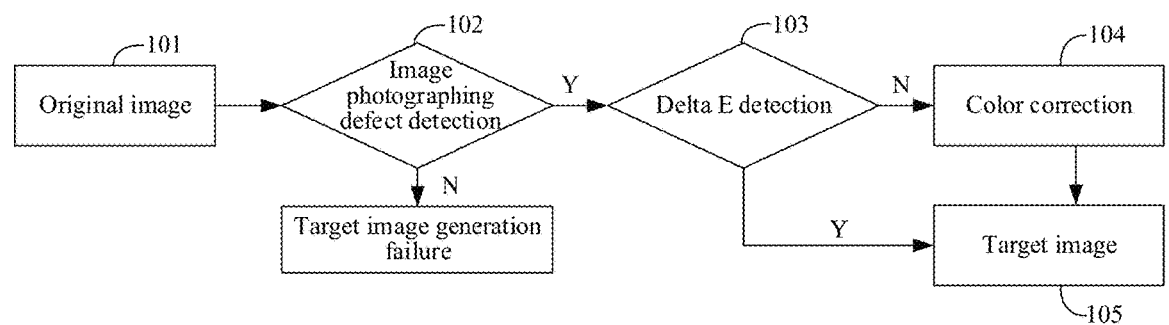
FIG. 1 is a schematic diagram of an image processing method according to an embodiment of this application.

In the embodiments of this application, an image processing method, that is an application of computer vision in artificial Intelligence technologies, is provided. FIG. 1 is a schematic diagram of an image processing method according to an embodiment of this application.

As shown in FIG. 1, in an image processing process, a computer device performs image photographing defect detection 102 and color deviation detection 103 on an original image 101. When both pass, a target image 105 may be directly generated based on the original image. When the color deviation detection 103 fails, color correction 104 is further required to be performed, so that the target image 105 is generated based on the color-corrected original image. When the image photographing defect detection 102 fails, the generation of the target image fails. In this case, re-photographing or a replacement of the original image is required, until the original image passes the image photographing defect detection 102.

By adopting the method provided by this embodiment of this application, for a target image (for example, an identity photo) with a specific photographing requirement, there is no need to photograph at a specific location, for example, a photo studio, which can reduce labor costs. In addition, generating the target image with the specific photographing requirement based on an image passing the image photographing defect detection and the color deviation detection can improve quality of the target image, thereby improving a verification success rate of the target image. If the color deviation detection fails, the color correction can be performed automatically to reduce learning costs of a user and improve generation efficiency of the identity photo.

A description is made below for application scenarios of the image processing method according to this embodiment of this application.

1. An Application Scenario of Obtaining an Image with a Specific Image Photographing Requirement.

In this application scenario, the image processing method according to this embodiment of this application may be implemented as an independent image generation application program, or may be applied to an application program providing an image photographing function, the application program including, but not limited to, an instant messaging application program, a payment application program, a file management application program, and the like. The application program may be installed in a computer device of a user for the user to obtain a required image.

In some embodiments, the scenario of obtaining the image with the specific image photographing requirement may include: a scenario of obtaining the identity photo, a scenario of obtaining a training sample set (for example, a training sample set used for target detection), and the like.

Taking the scenario of obtaining the identity photo by a user as an example of the scenario of obtaining the image, in this application scenario, an identity photo generation method according to this embodiment of this application may be implemented as an independent identity photo generation application program, or may be applied to an application program providing an identity photo photographing function, the application program including, but not limited to, an instant messaging application program, a payment application program, a file management application program, and the like. The application program may be installed in a computer device of the user for the user to obtain a required identity photo.

In this embodiment, the user may photograph in real time through the identity photo photographing function provided by the application program to generate an original image including a biological face, or upload the original image including the biological face that has been photographed to the application program. After obtaining the original image, the computer device performs image photographing defect detection and color deviation detection on the original image, automatically performs color correction when there exists color cast, and finally generates the identity photo required by the user based on a corrected original image, to improve quality of the identity photo.

2. An Application Scenario of Verifying an Image with a Specific Image Photographing Requirement.

In this scenario, the method according to this embodiment of this application may be implemented as an independent image verification application program, or may be applied to an application program providing an image verification function. The application program may be installed in a computer device of a verifier for the verifier to verify a to-be-verified identity photo.

In some embodiments, the scenario of verifying the image with the specific image photographing requirement may include: a scenario of verifying the identity photo, a scenario of obtaining a training sample set through screening (for example, obtaining a training sample set used for target detection through screening), and the like.

Taking the scenario of verifying the identity photo as an example of the scenario of verifying the image, in this application scenario, the method according to this embodiment of this application may be implemented as an independent identity photo verification application program, or may be applied to an application program providing an identity photo photographing function. The application program may be installed in a computer device of a verifier for the verifier to verify a to-be-verified identity photo.

In this embodiment, the verifier may input the to-be-verified identity photo into the application program, so that the computer device may perform image photographing defect detection, color deviation detection, and color correction on the inputted to-be-verified identity photo, to implement automatic evaluation and correction, which avoids manual verification and improves verification efficiency of the identity photo.

The foregoing uses only a few common application scenarios as examples for description. The method provided in this embodiment of this application may be further applied to another scenario of image processing. An actual application scenario is not limited in this embodiment of this application.

Information (including, but not limited to, user device information, user personal information, and the like), data (including, but not limited to, analyzed data, stored data, presented data, and the like), and a signal involved in this application are all authorized by the user or fully authorized by each side, and the collection, use and processing of relevant data are required to comply with a relevant law, regulation and standard of a relevant country and region. For example, the (original) image obtained by the computer device, the image obtained through photographing, and the (original) image including the biological face in this application are all obtained in a situation with full authorization.

Figure 2:
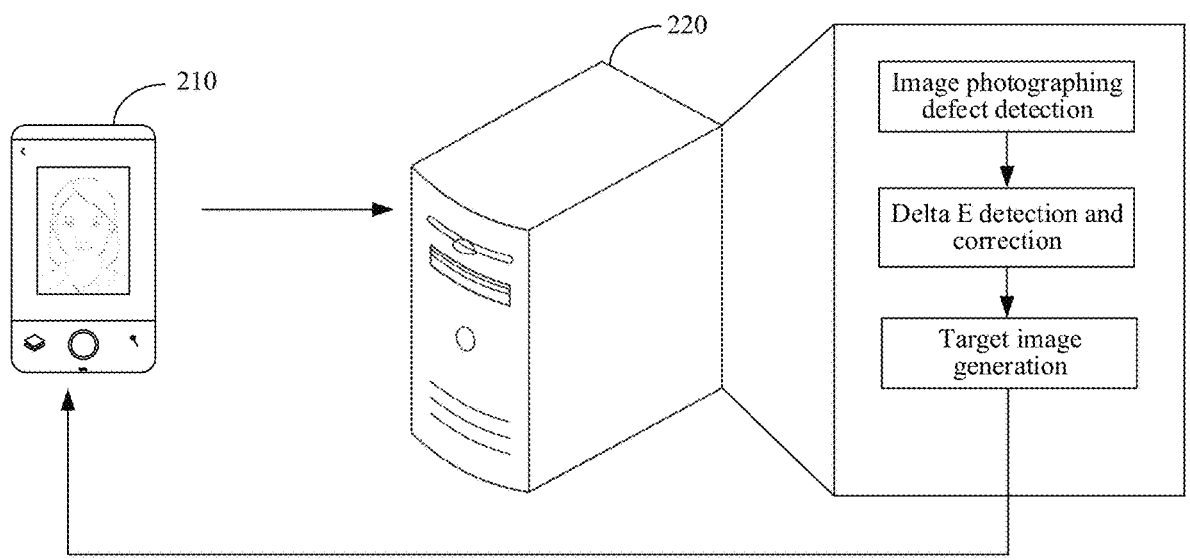
FIG. 2 is a schematic diagram of an implementation environment according to an embodiment of this application.

FIG. 2 is a schematic diagram of an implementation environment according to an embodiment of this application. The implementation environment includes a computer device 210 and a server 220. The computer device 210 is in data communication with the server 220 through a communication network. In some embodiments, the communication network may be a wired network or a wireless network, and the wireless network may be at least one of a local area network, a metropolitan area network, and a wide area network.

The computer device 210 is an electronic device installed with an application program providing an image processing function. In addition, the computer device 210 includes a camera, which can obtain an image through photographing in real time, to generate a target image based on the image obtained through photographing. The electronic device may be a smartphone, a tablet computer, a laptop portable computer, a desktop computer, or the like. A specific type of the computer device 210 is not limited in this embodiment of this application.

The server 220 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network, big data, and an artificial intelligence platform. In this embodiment of this application, the server 220 may receive an original image transmitted by the computer device 210.

In some embodiments, as shown in FIG. 2, an original image including a biological face may be inputted in the computer device 210, and the computer device 210 transmits the original image to the server 220. The server 220 performs image photographing defect detection and color deviation detection on the original image, and may further perform color correction on the original image when the color deviation detection fails, and finally generates a target image based on the original image after the correction. Finally, the generated target image is fed back to the computer device 210 to be presented by the computer device 210.

In another possible implementation, the computer device 210 may perform the image photographing defect detection, the color deviation detection, and the correction on the original image, to generate the target image, which is not limited in this embodiment. For ease of description, the following embodiments are described by using an example in which the image processing method is performed by a computer device.

Figure 3:
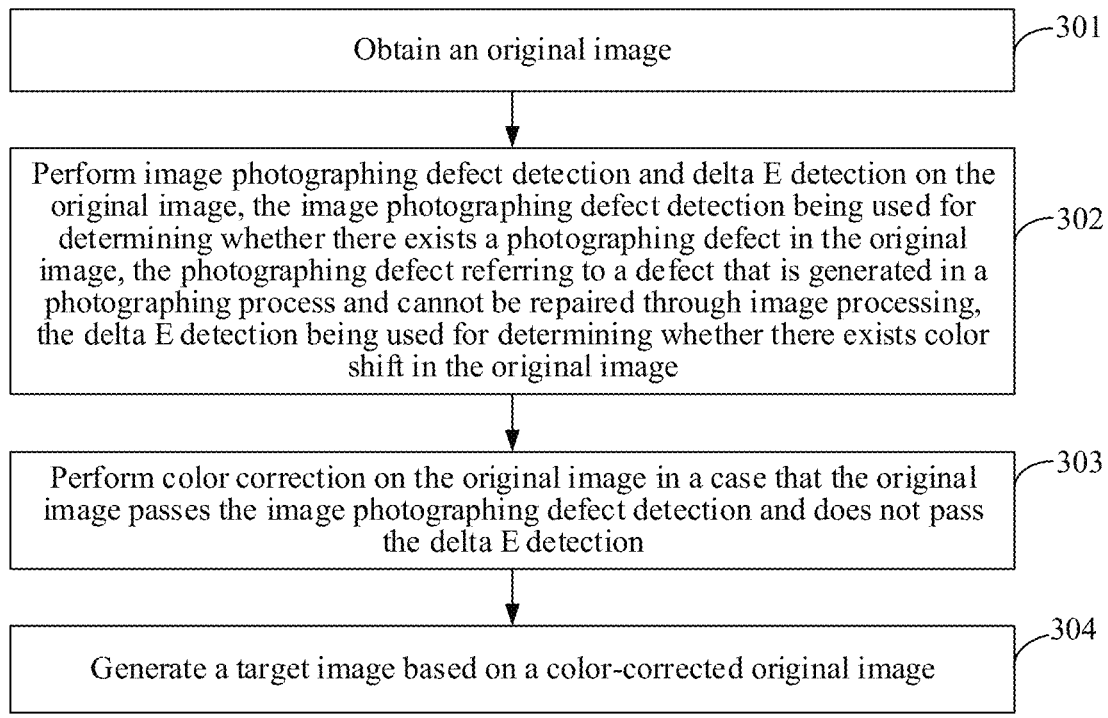
FIG. 3 is a flowchart of an image processing method according to an embodiment of this application.

FIG. 3 is a flowchart of an image processing method according to an embodiment of this application. In this embodiment, a description is made by using an example in which the method is applied to a computer device. The method includes the following steps:

Step 301: Obtain an original image.

The original image may be an image including a biological face, or may be an image including a scene and a building. A specific image content included in the original image is not limited in this embodiment of this application.

In some embodiments, the original image may be obtained through photographing in real time, or may be obtained from images already saved in the local, or may be obtained through capturing a video frame from a video to take a video frame image as the original image.

In some embodiments, when a user is in need of generating a target image meeting a specific photographing requirement based on the original image, the computer device performs image processing on the obtained original image to generate the target image.

S302: Perform image photographing defect detection and color deviation detection on the original image, the image photographing defect detection being used for determining whether there exists a photographing defect in the original image, the photographing defect referring to a defect that is generated in a photographing process and irreparable through image processing, the color deviation detection being used for determining whether there exists color cast in the original image.

Due to the limitations on the obtaining scene and the method for obtaining the original image, there are photographing defects in the original image. Therefore, to ensure the image quality of the generated target image, in one embodiment, the image photographing defect detection and the color deviation detection are performed on the original image, to avoid a photographing defect or a color defect existing in the generated target image.

S303: Perform color correction on the original image when the original image passes the image photographing defect detection and does not pass the color deviation detection.

Since the photographing defect refers to the defect that is generated in an original image photographing process and irreparable through the image processing, that is, the original image that does not pass the image photographing defect detection cannot be used for generating the target image; while the color defect may be repaired through the color correction, to avoid performing a subsequent target image generation process (a color correction process) on the original image that does not pass the image photographing defect detection, in one embodiment, the color correction and the subsequent target image generation process are set to be performed on the original image only in case that the original image passes the image photographing defect detection and does not pass the color deviation detection.

In some embodiments, for the original image that passes the image photographing defect detection but does not pass the color deviation detection, continuing to perform the subsequent target image generation process through the color correction may also avoid the user to re-obtain the original image and improve generation efficiency of the target image.

S304: Generate the target image based on the color-corrected original image.

In some embodiments, after the color correction is performed on the original image, there exists no photographing defect and no color defect in the color-corrected original image, and the color-corrected original image may be determined as the target image.

In some embodiments, in some scenarios, for example, in a scenario of generating an identity photo, there may exist a requirement on a background of the original image, then background replacement may be performed on the color-corrected original image, to generate the target image.

In conclusion, in this embodiment of this application, after obtaining the original image, the image photographing defect detection and the color deviation detection are performed on the original image. On the one hand, whether there exists the photographing defect that is irreparable in the image can be detected through the image photographing defect detection, so that the user may be guided to perform appropriate photographing based on a detection result subsequently. On the other hand, whether there exists the color cast in the original image can be detected through the color deviation detection. If the color cast exists, the color correction is performed automatically, and the target image is generated based on the original image after the correction, which may improve a quality of the target image, thereby helping improve a verification success rate of the target image, and the automatic color correction can reduce learning costs of the user and help improve the verification success rate of an image photographed by the user in any scenario; in addition, performing the color correction on the original image that passes the image photographing defect detection and does not pass the color deviation detection can avoid an inefficient color correction process performed on the original image that does not pass the image photographing defect detection, thereby reducing a correction calculation amount of the computer device.

The image processing method is described by using a scenario of generating an identity photo as an example in the following embodiment. In the scenario of generating the identity photo, an original image includes a biological face, and a target image is a generated identity photo.

Figure 4:
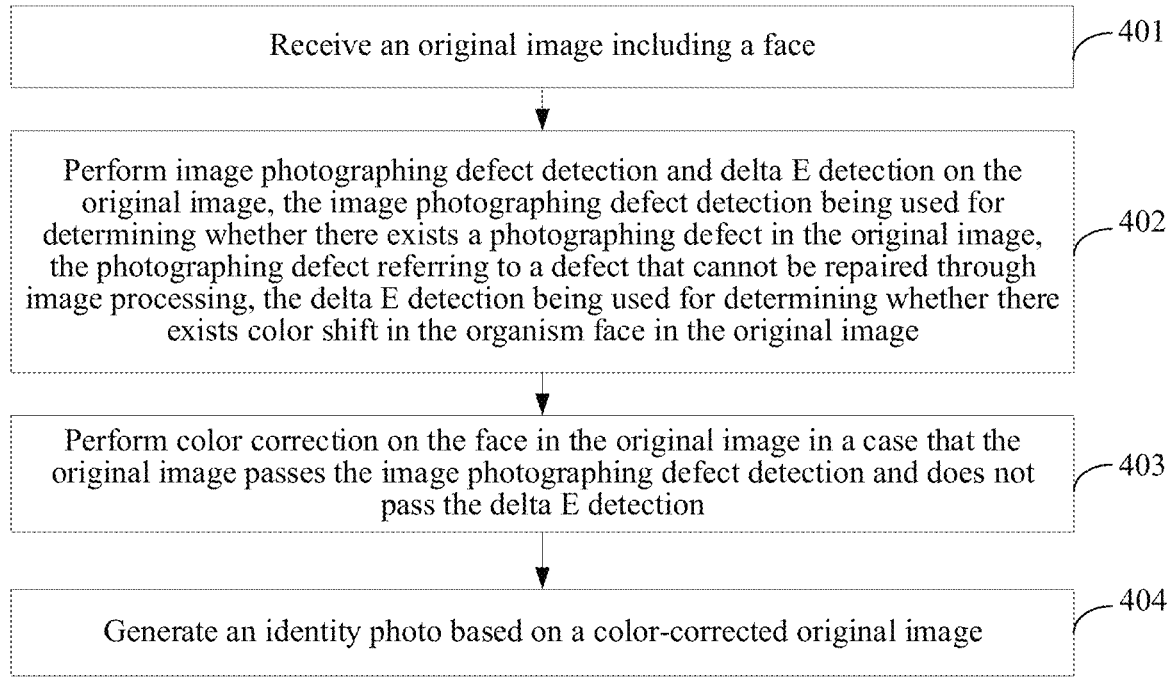
FIG. 4 is a flowchart of an image processing method according to another embodiment of this application.

FIG. 4 is a flowchart of an image processing method according to another embodiment of this application. In this embodiment, a description is made by using an example in which the method is applied to a computer device. The method includes the following steps:

S401: Obtain an original image, where the original image includes a biological face.

In this embodiment of this application, the original image refers to an image including the biological face. In some embodiments, the original image may be obtained through photographing in real time, or may be obtained from images already saved in the local and including the biological face, or may be obtained through capturing a video frame including the biological face from a video to take a video frame image as the original image.

In some embodiments, in this embodiment of this application, the biological face in the original image may be a human face, or may be an animal face. That is, a human identity photo may be generated based on an original image including a human face, to meet an identity photo requirement in various scenarios; or an animal identity photo may be generated based on an original image including an animal face, and an identity photo used for identity verification is generated for an animal such as a cat and a dog. A specific type of the biological face is not limited in this embodiment of this application.

In some embodiments, after obtaining an original image including a biological face, a required identity photo is generated based on the original image.

User authorization is needed when a computer device obtains the original image, and the following is a specific process of performing the user authorization. Before the computer device obtains the original image, a prompt box needs to pop up on an interface of the computer device, where the prompt box includes prompt information and operation controls (a confirmation control and a cancellation control), and the prompt information is used for reminding the user that the original image needs to be obtained to perform a subsequent identity photo generation process. When a trigger operation of the user on the confirmation control is received, it is determined that the acquisition of the original image is authorized by the user, and a subsequent process of obtaining the original image may be performed.

In some embodiments, for a difference of an origin of the original image in this application, there is a difference in the specific timing of performing the user authorization. For example, if the original image is obtained through photographing in real time by a camera of the computer device, then the prompt box needs to pop up to perform the steps of the user authorization when the computer device enables the camera to take a photo; if the original image is obtained from images saved in the local, then the prompt box needs to pop up to perform the steps of the user authorization before obtaining the original image from the local; if the original image is obtained through capturing from a local or online video, then the prompt box needs to pop up to perform the steps of the user authorization when a video capturing operation is performed, or the like.

S402: Perform image photographing defect detection and color deviation detection on the original image, the image photographing defect detection being used for determining whether there exists a photographing defect in the original image, the photographing defect referring to a defect that is generated in a photographing process and irreparable through image processing, the color deviation detection being used for determining whether there exists color cast in the original image.

For the identity photo, there are many specification requirements in many aspects, such as clothing, a posture, brightness and a hue. Therefore, to generate an identity photo meeting the specification requirements, a plurality of detection, such as normative detection for clothing, posture, and the like, color-related detection for image brightness, hue, and the like, needs to be performed on the original image. In some embodiments, after the original image is obtained, the image specification level detection and the color deviation detection need to be performed on the original image to avoid that the subsequence identity photo generation process is affected because there exists an irreparable defect in the original image.

The image specification level detection refers to irreparable damage detection (photographing defect detection), that is, detecting an irreparable defect, such as a turning of light and head in photographing, facial organ being blocked, and the like, in the image. This type of defect cannot be modified subsequently. Therefore, when the image specification level detection fails, the identity photo cannot be generated based on the original image, and the original image may be retaken or replaced.

The color deviation detection is to detect whether there exists color cast in the biological face in the original image, which is to say, there is difference between the color of the biological face presented in the original image and the color of the biological face itself. The color cast problem is mainly caused by an outside factor such as acquiring environment and acquiring device of the original image. For example, detecting whether there is a color cast problem in a facial area in the original image. An image defect about the color cast problem may be further modified and there is no need to replace the original image. Therefore, in one embodiment, when the color deviation detection fails, the computer device may further perform color correction on the original image, and generates the identity photo based on a color-corrected original image.

In some embodiments, in performing the image photographing defect detection and the color deviation detection on the original image, the image photographing defect detection and the color deviation detection may be performed on the original image simultaneously; the image photographing defect detection may be performed on the original image first and then the color deviation detection on the original image may be performed; or the color deviation detection may be performed on the original image first and then the image photographing defect detection may be performed.

S403: Perform the color correction on the biological face in the original image when the original image passes the image photographing defect detection and does not pass the color deviation detection.

For the color cast problem in the related art, existence of the color cast can only be known through the perception of a professional or according to the feedback of an identity photo generation failure. After the existence of the color cast is known, the professional is required to correct the color cast, which increases the learning cost of an identity photo verifier, and has a relatively low generation efficiency of the identity photo. In this embodiment of this application, when the original image passes the image photographing defect detection but does not pass the color deviation detection, it represents that there exist no unmodifiable photographing defects in the original image, and there may exist some modifiable color cast problems. Therefore, there is no need to directly feedback the identity photo generation failure. Instead, the color can be corrected to solve the color cast problems and continue a subsequence identity photo generation process, and there is no need to re-obtain the original image or perform manual modification by the professional, to improve identity photo generation efficiency.

In some embodiments, when performing the color deviation detection and the color correction, the color correction may be performed on the original image based on a biological face image including a qualified color, to make a corrected color meet the requirement of the identity photo.

In some embodiments, if the computer device determines that the original image does not pass the image photographing defect detection and does not pass the color deviation detection; or if the computer device determines that the original image does not pass the image photographing defect detection and passes the color deviation detection, it represents that there is a hard defect that cannot be modified in the original image, and the subsequent identity photo generation process cannot be continued, and an identity photo generation failure or an identity photo uploading failure is fed back to the user to prompt the user to re-obtain the original image.

In some embodiments, after the identity photo generation fails, a reason of the identity photo generation failure may be fed back to the user. For example, when the image photographing defect detection fails, the photographing defect existing in the original image may be fed back to the user.

S404: Generate the identity photo based on a color-corrected original image.

In some embodiments, after the color correction, there may exist another format requirement problem in the original image. Since problems about format and the like may be modified, the color-corrected original image may be further modified to generate the identity photo. Since the identity photo has passed the image photographing defect detection and the color deviation detection, that is, detection and adjustment in multiple dimensions have been performed to make the identity photo meet requirements in multiple aspects. Therefore, a success rate of identity photo verification may be improved and re-taking the identity photo may be avoided.

In conclusion, in this embodiment of this application, after the original image including the biological face is obtained, the image photographing defect detection and the color deviation detection are performed on the original image. On the one hand, whether there exists the photographing defect that is irreparable through image processing in the image can be detected through the image photographing defect detection, so that the user may be guided to perform appropriate photographing based on a detection result subsequently. On the other hand, whether there exists the color cast in the biological face in the original image can be detected through the color deviation detection. If the color cast exists, the color correction is performed automatically, and the identity photo is generated based on the corrected original image, which may improve a quality of the identity photo, thereby helping improve a verification success rate of the identity photo, and the automatic color correction can reduce learning costs of the user and help improve the verification success rate of an identity photo photographed by the user in any scenario; in addition, performing the color correction on the original image that passes the image photographing defect detection and does not pass the color deviation detection can avoid an inefficient color correction process performed on the original image that does not pass the image photographing defect detection, thereby reducing a correction calculation amount of the color correction performed on the original image.

In some embodiments, when performing the image photographing defect detection, a plurality of aspects such as ambient light brightness value, facial brightness, a face angle, and a face feature may be detected, to ensure the qualification of the identity photo. In addition, when performing the color deviation detection, whether there exists the color cast problem may be determined based on an average pixel value of a pixel point in a facial area, and the pixel value may be modified to finish correction on the color cast of the original image. An embodiment is provided below for description.

Figure 5:
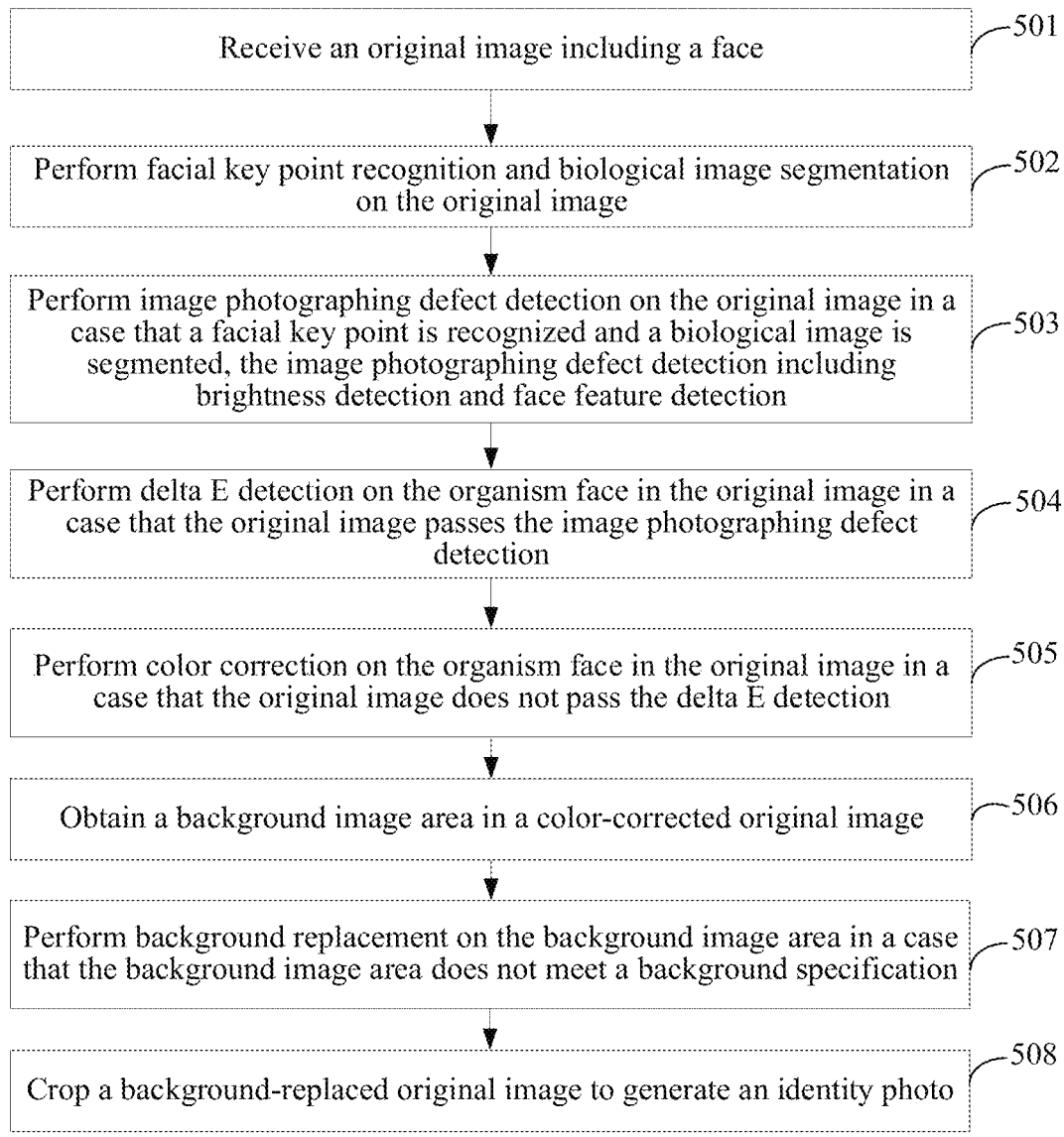
FIG. 5 is a flowchart of an image processing method according to another embodiment of this application.

FIG. 5 is a flowchart of an image processing method according to another embodiment of this application. In this embodiment, a description is made by using an example in which the method is applied to a computer device. The method includes the following steps:

S501: Obtain an original image including a biological face.

For the implementation of this step, reference may be made to step 401, and details are not described again in this embodiment.

S502: Perform facial key point recognition and biological image segmentation on the original image.

Since image photographing defect detection and color deviation detection are both for the biological face or a biological face area in the original image, and has nothing to do with a background area, to improve the efficiency of subsequence detection, before the image photographing defect detection and the color deviation detection are performed on the original image, the facial key point recognition and the biological image segmentation need to be performed on the original image first, to ensure that a facial key point and an biological image in the image may be recognized and obtained, to avoid that in the subsequence detection, the detection fails due to a failure of recognizing the facial key point and a failure of segmenting the biological image.

In some embodiments, a fully convolutional network (FCN) may be adopted to perform the biological image segmentation. If the facial key point recognition fails or the biological image segmentation fails, the user can be prompted that the identity photo cannot be generated based on the original image, and image replacement may be performed or the biological face image may be retaken until the facial key point recognition succeeds and the biological image segmentation succeeds.

S503: Perform the image photographing defect detection on the original image when a facial key point is recognized and an biological image is segmented, the image photographing defect detection including brightness detection and face feature detection.

Since the image photographing defect detection is used for detecting whether there exists a defect that is irreparable through image processing, and the color deviation detection is for a correctable color cast problem in the original image, to avoid to perform an inefficient color deviation detection process, in one embodiment, the image photographing defect detection is performed on the original image first, to determine whether to perform the subsequent color deviation detection according to an image photographing defect detection result; that is, if the image photographing defect detection fails, it represents that there exists a hard defect that cannot be modified in the image, the identity photo generation fails and there is no need to perform the subsequent color deviation detection; if the image photographing defect detection succeeds, it represents that the subsequent color deviation detection may be performed continuously.

In some embodiments, when a facial key point is recognized and a valid biological image is obtained through segmentation, it represents that there exists a valid biological image and a valid facial area in the original image, and subsequent steps of performing the image photographing defect detection on the original image may be performed.

The image photographing defect detection includes brightness detection and face feature detection, where the brightness detection is used for detecting whether the brightness of the original image meet a photographing specification, that is, detecting whether there exists a brightness defect (a photographing defect) that cannot be modified in the brightness of the original image, for example, whether ambient light strength and facial brightness meet the requirement; and the face feature detection is used for determining whether there exists a face feature defect (a photographing defect) that cannot be modified in a face feature of the biological face in the original image.

A process of performing the brightness detection on the original image may include the following step one and step two.

Step one: Determine ambient light brightness value and a facial brightness difference corresponding to the original image, the facial brightness difference being used for representing a brightness difference of different facial sub-areas.

In some embodiments, when the brightness detection is performed, the ambient light brightness value of the original image and the brightness difference of different facial sub-areas in the original image are obtained first, so that whether the original image meets a specification in an identity photo brightness aspect is determined according to the ambient light brightness value and the brightness difference of different facial sub-areas.

In some embodiments, the ambient light brightness value may be obtained from exchangeable image file (EXIF) information of the original image. When the EXIF information of the original image is lost or there is no EXIF information, the ambient light brightness value may be determined based on a pixel value of a pixel point in a background image area in the original image.

When the ambient light brightness value is determined based on the pixel value of the pixel point in the background area, a brightness mean value of the background area may be determined based on the pixel value of each pixel point, and a calculation method is as below:

$$\text{Brightness}=0.3*R+0.6*G+0.1*B$$

Brightness represents a brightness value of a pixel point, R is a pixel value of an R channel of the pixel point, G is a pixel value of a G channel of the pixel point, and B is a pixel value of a B channel of the pixel point.

After obtaining the brightness value of each pixel point in the background area, a mean value of the brightness values may be calculated to obtain the brightness mean value of the background area, which may be used as the ambient light brightness value for determining brightness qualification.

In some embodiments, when obtaining the facial brightness difference, the biological face in the original image may be divided into at least two facial sub-areas, and the facial brightness difference may be determined based on the brightness of the facial sub-areas. When dividing the face, the dividing may be performed based on the facial key point obtained through recognition. For ease of description, the following embodiment is described by using an example in which the biological face is a human face.

Figure 6:
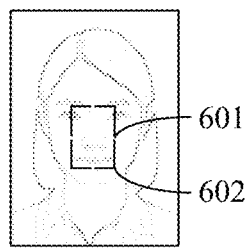
FIG. 6 is a schematic implementation diagram of obtaining a face area according to an embodiment of this application.

As shown in FIG. 6, a human face area is determined based on a location distribution of human facial key points. For example, a human face area 602 is obtained based on a boundary median point 601, and facial sub-areas are obtained through dividing the human face area 602.

Figure 7:
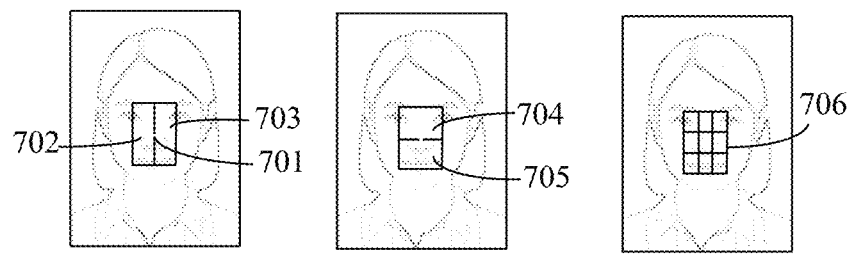
FIG. 7 is a schematic implementation diagram of dividing a face area according to an embodiment of this application.

The human face area may be divided in a plurality of division methods. As shown in FIG. 7, a left facial sub-area 702 and a right facial sub-area 703 may be obtained based on performing vertical division on a nose tip point 701; an upper facial sub-area 704 and a lower facial sub-area 705 may be obtained based on performing horizontal division on the nose tip point 701; or nine facial sub-areas may be obtained through adopting a nine-square grid method 706 to perform division on the human face area. For the human face division method, another method may be adopted for the division. This embodiment of this application is merely schematic description, and does not limit a specific human face division method.

In some embodiments, the method of determining the facial brightness difference based on the brightness of the facial sub-areas may include step A to step D:

Step A: Divide the biological face in the original image into the at least two facial sub-areas through at least one division method.

In some embodiments, when performing division, the at least two facial sub-areas may be obtained through any one division method, a pixel value of a pixel point in each facial sub-area may be calculated respectively to obtain a pixel mean value of each facial sub-area, a pixel mean value of the facial area may be obtained based on the pixel mean value of each facial sub-area, and the pixel mean value of the facial area may be determined as the facial brightness difference.

In another possible implementation, obtaining the facial brightness difference based on only one division method may exist a deviation. To improve accuracy, the facial area may be divided through a plurality of division methods, so that the facial brightness difference may be determined based on a pixel mean value obtained through the plurality of division methods.

Step B: Determine sub-area brightness of each of the facial sub-areas based on a pixel value of a pixel point in the facial sub-area.

After performing the division on the biological face, the sub-area brightness of each of the facial sub-areas is determined. In some embodiments, when the human face is divided into a left facial sub-area and a right facial sub-area, for the left facial sub-area, a brightness value of each pixel in the left facial sub-area may be calculated and a mean value may be obtained to obtain sub-area human facial brightness of the left sub-area. Sub-area human facial brightness of the right facial sub-area may be determined based on the same method.

Step C: Determine basic facial brightness differences corresponding to different division methods based on the sub-area brightness of each of the facial sub-areas.

In some embodiments, after the sub-area brightness is determined, the basic facial brightness difference is determined based on the sub-area brightness. For example, when a left and right face division is adopted on the human face, after the sub-area human facial brightness of a left facial sub-area and a right facial sub-area are obtained, a mean value is obtained to obtain the basic facial brightness difference corresponding to the left and right face division method.

To improve determination accuracy, the obtained basic facial brightness difference may be further normalized to obtain normalized basic facial brightness difference.

Step D: Obtain the facial brightness difference through weighted calculation based on the basic facial brightness differences and weights corresponding to the division methods.

After the facial brightness difference corresponding to each of the division methods is obtained, the facial brightness difference is obtained based on the basic facial brightness difference and the weights corresponding to the variety of the division methods. In some embodiments, after the left and right face division, an upper and lower face division, and a nine-square grid division are adopted on the human face area, and after respectively corresponding basic facial luminance differences are obtained, the facial brightness difference is calculated as follows:

$$R = W_1 R_{leftright} + W_2 R_{topbottom} + W_3 R_{ninepart} + W_4 R_{totalface}$$

R represents the facial brightness difference, $R_{leftright}$ refers to a normalized basic facial brightness difference obtained based on the left and right face division, $W_1$ is a weight corresponding to the left and right face division method, $R_{topbottom}$ refers to a normalized basic facial brightness difference obtained based on the upper and lower face division, $W_2$ is a weight corresponding to the upper and lower face division method, $R_{ninepart}$ refers to a normalized basic facial brightness difference obtained based on the nine-square grid division, $W_3$ is a weight corresponding to the nine-square grid division method, $R_{totalface}$ refers to a normalized basic facial brightness difference obtained based on the entire human face area, and $W_4$ is a weight corresponding to the entire human face.

In some embodiments, weights corresponding to different division methods may be set based on a specific requirement of the identity photo. For example, a requirement on side light is relatively high, the weight corresponding to the left and right face division method may be increased, that is, $W_1$ may be increased.

Step two: Determine that the original image passes the brightness detection when the ambient light brightness value is within a brightness value range and the facial brightness difference is less than a brightness difference threshold.

After the ambient light brightness value and the facial brightness difference are obtained, whether the original image passes the brightness detection is determined based on the ambient light brightness value and the facial brightness difference. In some embodiments, when the ambient light brightness value obtained based on the EXIF information is within the brightness value range or when the ambient light brightness value indicated by the background area is within the brightness value range, the ambient light brightness value is determined in the brightness value range. In another possible implementation, to ensure a detection accuracy rate of the ambient light brightness value, when the ambient light brightness value obtained based on the EXIF information is within the brightness value range and when the ambient light brightness value indicated by the background area is within the brightness value range, the ambient light brightness value is determined in the brightness value range.

It is determined that the original image passes the brightness qualification detection when the ambient light brightness value is within the brightness value range and the facial brightness difference is less than the brightness difference threshold, where the brightness difference threshold may be set according to a brightness requirement of the identity photo.

In some embodiments, apart from performing the foregoing brightness detection, there are certain requirements of the identity photo on a face angle, a facial organ state, and the like in the image. Therefore, the computer device may further perform face feature detection on the original image, where a process of performing the face feature detection on the original image may include the following step three to step five.

Step three: Determine a facial key point of the biological face in the original image.

After facial key point recognition is performed on the original image, the facial key point may be determined. For example, after human facial key point recognition is performed on the human face, position information including key points such as eyes, eyebrows, a mouth, and facial contours may be obtained.

Step four: Determine a face angle and a facial organ state of the biological face in the original image based on the facial key point, where the face angle refers to an angle between the facial key point and a standard facial key point in the original image. Taking determining a human face angle as an example, in some embodiments, after human facial key points are determined, the computer device performs space transformation on the human facial key points in the original image to fit standard facial key points. In some embodiments, the human face angle may be determined based on coordinate transformation by fitting human facial key point coordinates with standard human facial key point coordinates. For example, a human face pitch angle (an angle that the human face rotates around an X axis), a human face yaw angle (an angle that the human face rotates around a Y axis) and a human face roll angle (an angle that the human face rotates around a Z axis) may be determined.

In some embodiments, after the face angle is determined according to the facial key point, the facial organ state needs to be determined, where the facial organ state includes a facial organ blocking state, for example, whether the eyes, mouth, face, and eyebrows of the human face are blocked; and the facial organ state further includes a facial organ open and closed state, for example, an opening degree of the eyes and mouth of the human face.

In some embodiments, the facial organ blocking state may be determined based on a key point confidence level corresponding to the facial key point. A blocking state is negatively correlated with a confidence level, that is, the lower the key point confidence level, the greater the probability of being blocked.

In some embodiments, the facial organ open and closed state may be determined based on a key point distance between the facial key points. For example, an open and closed state of the eyes may be determined based on a key point distance determined based on coordinates of upper and lower key points of the eyes, so that an opening degree of the eyes may be determined.

Step five: Determine that the original image passes the face feature detection when the face angle is within an angle range and the facial organ state matches a target organ state.

After the face angle and the facial organ state are obtained, whether the original image passes the face feature detection may be determined based on the two. In some embodiments, when the obtained face angle is within the angle range, that is, when an angle between the biological face in the original image and a standard biological face is smaller than an angle threshold, the face angle is determined to meet the requirement. In some embodiments, different angles may correspond to different angle thresholds. For example, the human face pitch angle, the human face yaw angle, and the human face roll angle may be correspondingly set to different angle thresholds, When the different angles are all smaller than the corresponding different angle thresholds, the face angle is determined to be within the angle range.

When the obtained facial organ state matches the target organ state, that is, when the facial organ blocking state indicates not being blocked and the opening degree of the facial organ is within a preset range, the facial organ is determined to meet the requirement.

S504: Perform the color deviation detection on the biological face in the original image when the original image passes the image photographing defect detection.

In some embodiments, that the original image passes the image photographing defect detection represents that there is no defect that cannot be modified in the original image. Therefore, after passing the image photographing defect detection, the color deviation detection is performed on the original image to detect whether the color of the biological face in the original image meets the requirement.

In some embodiments, the color deviation detection may include step six to step eight.

Step six: Determine a target facial area of the biological face in the original image.

When the color deviation detection is performed, the entire biological face may be extracted to be performed on color detection. Since a relatively high accuracy is required on an algorithm for extracting an entire face, to reduce difficulty and a calculation amount of the color detection, in some embodiments, the target facial area of the biological face in the original image is extracted, that is, the color deviation detection is performed on a part of the facial area.

Figure 8:
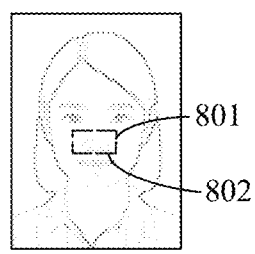
FIG. 8 is another schematic implementation diagram of obtaining a face area according to an embodiment of this application.

Taking a human face as an example, in some embodiments, the target facial area is a target human facial area and may be determined based on recognized human facial key point positions. As shown in FIG. 8, four mean value points 801 may be determined according to a position distribution of the human facial key point, and the target human facial area 802 is determined based on the mean value points 801.

Step seven: Determine an average pixel value of the target facial area based on the pixel value of a pixel point in the target facial area.

After the target facial area is determined, the average pixel value of the target facial area is determined according to pixel values in the target facial area, where the average pixel value includes an average R value, an average C value and an average B value. The color deviation detection is performed on the average pixel value subsequently.

Step eight: Perform the color deviation detection based on the average pixel value.

In some embodiments, when the color deviation detection is performed on the average pixel value, it is determined that the original image passes the color deviation detection when the average R value is greater than the average G value, the average G value is greater than the average B value, a ratio of the average R value to the average G value is within a first ratio interval, and a ratio of the average G value to the average B value is within a second ratio interval.

In some embodiments, when the average pixel value satisfies the following condition, the original image is determined to pass the color deviation detection.

$$\begin{cases} Red < \alpha_1 * Green \\ Green < \beta_1 * Blue \\ Red > \alpha_2 * Green \\ Green > \beta_2 * Blue \end{cases}$$

Red represents the average R value, Green represents the average G value, Blue represents the average B value, and $\alpha_1, \beta_1, \alpha_2, \beta_2$ are set interval parameters and are all within a range of 1-2.

In some embodiments, to improve detection accuracy of the color deviation detection, in some embodiments, at least two target facial areas of the biological face in the original image may be selected, and the color deviation detection may be performed on the at least two target facial areas, so that a color deviation detection result of the original image may be comprehensively determined according to a color deviation detection result of the at least two target facial areas. That is, if the selected plurality of target facial areas all pass the color deviation detection, the original image is determined to pass the color deviation detection; and if in the selected plurality of target facial areas, there is a target facial area does not pass the color deviation detection, to avoid a detection error, the color deviation detection may be performed on the entire biological face to ensure the valid and correctness of a color deviation detection result.

In some embodiments, when the original image passes the color deviation detection, there is no need to perform a subsequent color correction process, and an identity photo may be generated according to the original image; and if the original image does not pass the color deviation detection, the color correction needs to be performed on the original image to avoid that a color cast problem affects a subsequent identity photo generation process.

S505: Perform the color correction on the biological face in the original image when the original image does not pass the color deviation detection.

After it is determined that the biological face in the original image does not pass the color deviation detection according to the average pixel value, the color correction may be performed on the biological face in the original image. In some embodiments, a modification curve is obtained by fitting the average pixel value and a standard biological face pixel value, and then the color of the biological face in the original image is modified based on a modification area. In some embodiments, a process of performing the color correction on the original image may include step nine to step eleven.

Step nine: Determine a target standard pixel value corresponding to the average pixel value from a standard pixel value space, a standard pixel value in the standard pixel value space being an average pixel value of a pixel point in a facial area corresponding to a standard biological face, the standard biological face referring to a biological face without color deviation.

In some embodiments, when the color correction is performed on the biological face in the original image, a plurality of images including face areas that meet a standard requirement are obtained first, average pixel values of facial areas corresponding to standard organ or biological feature in every images are obtained through calculation and recorded, to obtain a set of standard pixel values, that is, the standard pixel value space. After the average pixel value, that is, $P_{arg}$ (Red, Green, Blue), of the pixel point in the facial area corresponding to the biological face in the original image is determined, a target standard pixel value $P_{stan}$ (Red, Green, Blue) matching the average pixel value may be determined in the standard pixel value space, and the target standard pixel value may be a pixel value being closest to the average pixel value in the standard pixel value space.

In some embodiments, when the target standard pixel value is selected from the standard pixel value space, an average pixel value corresponding to the biological features in the original image needs to be selected from the standard pixel value space first, so that the target standard pixel value with a closest distance may be determined from the average pixel value. For example, if the biological feature in the original image is a "cat", then an average pixel value corresponding to the "cat", instead of an average pixel value corresponding to a "dog", needs to be determined in the standard pixel value space.

Step ten: Determine a modification parameter corresponding to each color channel based on the average pixel value and the target standard pixel value.

A method of determining the modification parameter corresponding to each color channel based on the average pixel value and the determined target standard pixel value is as follows:

$$y=\delta(x^2-x)+x$$

y is the target standard pixel value, x is the average pixel value, and δ is the modification parameter. After $P_{arg}$ (Red, Green, Blue) and $P_{stan}$ (Red, Green, Blue) are inputted, a modification parameter $\delta_1$ corresponding to the R channel, a modification parameter $\delta_2$ corresponding to the G channel and a modification parameter $\delta_3$ corresponding to the B channel may be obtained.

Step eleven: Perform pixel value modification on a pixel value of a pixel point in the biological face area in the original image by using the modification parameter corresponding to each color channel.

After the modification parameter corresponding to each channel is obtained, the R value, B value, and G value of each pixel value in the facial area in the original image are modified respectively to obtain modified pixel values, to finish color cast modification on the original image.

Step 506: Obtain a background image area in a color-corrected original image.

Since in the identity photo generation process, in addition to the biological face area in the original image needs to meet a certain identity photo specification, identity photos in different scenarios may have different background specification requirements. For example, a driver's license needs to be white, and a degree certificate needs to be blue. Due to the limitation of a photographing site, a background image requirement corresponding to the original image may be different from an identity photo requirement. Therefore, to further improve the qualification of a generated identity photo, determination about background image qualification further needs to be performed on the color-corrected original image. Then, the background image area in the color-corrected original image needs to be obtained first.

A process of obtaining the background image area may be obtained in a process of segmenting the biological image in an early stage.

Step 507: Perform background replacement on the background image area when the background image area does not meet a background specification.

In some embodiments, after the color correction is performed, the biological image in the original image has met a standard requirement, but there may exist a problem that the background area does not meet the background specification. For example, a required background may include colors such as blue, red and white, and when it is detected that a background area color does not match the required color, the background area is separated from the biological image in the image through biological image segmentation, and the background area is replaced to obtain a background color that meets the requirement.

Step 508: Crop a background-replaced original image to generate the identity photo.

In some embodiments, after the background is replaced, a size of the image needs to be detected to determine whether the size meets a requirement, such as: identity photo (22 mm×32 mm), driver's license photo (21 mm×26 mm) and small one-inch color photo (27 mm×38 mm). The original image is cropped according to an identity photo type or an identity photo requirement, to generate the identity photo.

In this embodiment, through performing brightness detection on the original image, whether there exists a photographing defect that is irreparable through image processing in the ambient light brightness value and the facial brightness of the original image are detected, and face feature detection is performed to detect whether there exists a photographing defect that is irreparable through image processing in a face angle and a facial organ state in the original image. When the brightness detection and the face feature detection both succeed, it is determined that the original image passes the image photographing defect detection, thereby improving a verification success rate of a generated identity photo.

In addition, in this embodiment, whether there is color cast is determined based on the average pixel value of the face area. When there is a color cast problem, the pixel value of the pixel point in the face area is modified based on the modification parameter corresponding to each channel to complete the color correction and avoid that the identity photo does not meet the specification requirement due to the color cast and improve the verification success rate of the generated identity photo. In addition, an automatic color cast modification may reduce labor costs and help improve the generation efficiency of the identity photo.

In addition, in a process of performing qualification detection on the original image, the image photographing defect detection is performed on the original image first, and then whether to perform the color deviation detection on the original image is determined based on an image photographing defect detection result, which can avoid performing the color deviation detection on the original image when the original image does not pass the image photographing defect detection, and reduce an ineffective color deviation detection process, thereby reducing a detection calculation amount of the computer device.

Figure 9:
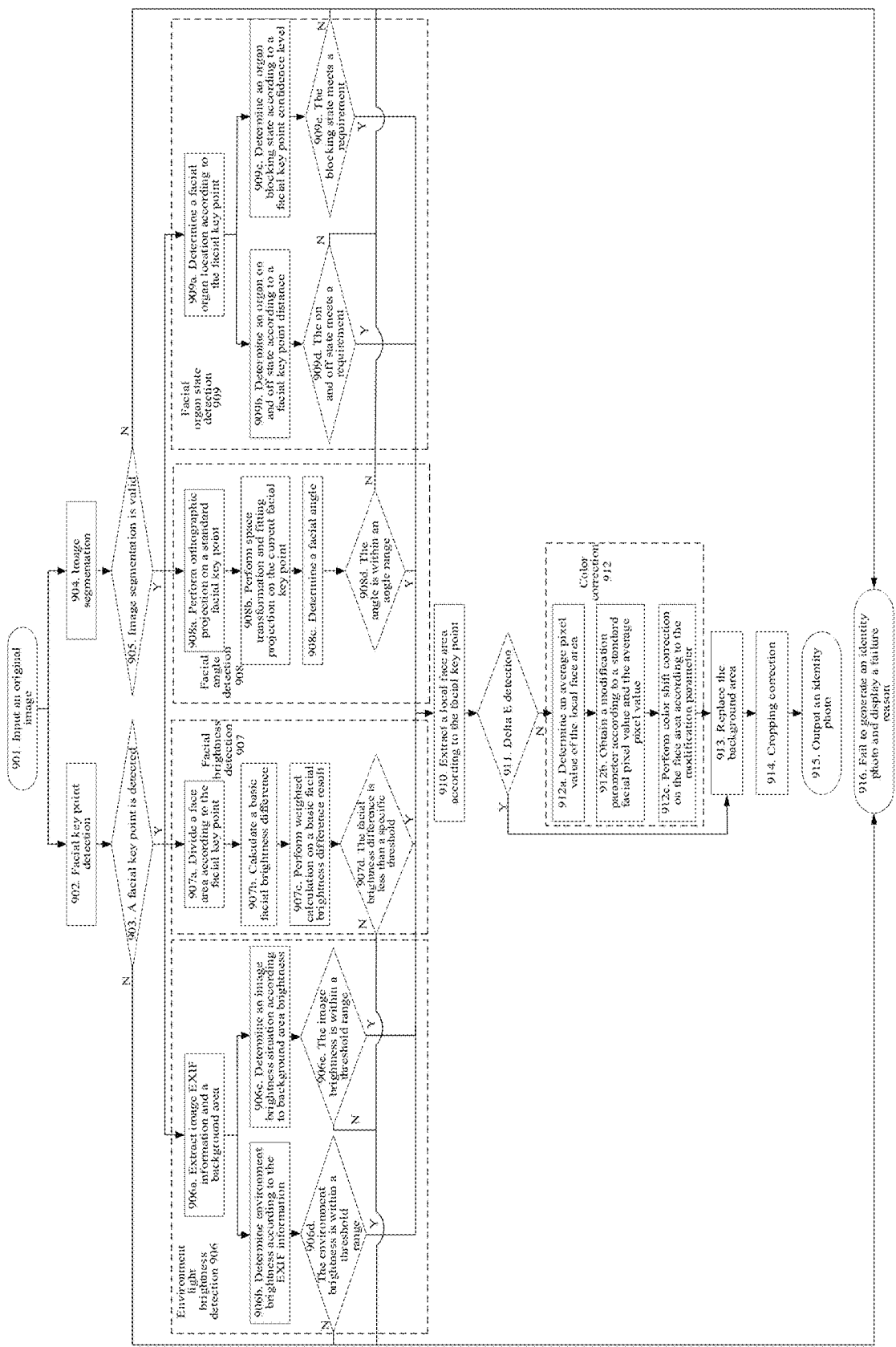
FIG. 9 is a flowchart of an identity photo generation method according to another embodiment of this application.

In combination with the above embodiments, taking a human face as the biological face as an example, a generation process of the identity photo is shown in FIG. 9, and is described by using an example in which the method is performed by a computer device.

S901: Input an original image.

For the implementation of this step, reference may be made to S301, and details are not described again in this embodiment.

S902: Facial key point detection.

S903: Determine whether a facial key point is detected, if not, perform S916.

S904: Image segmentation.

This step is simultaneously performed with S902.

S905: Determine whether the image segmentation is effective, if not, perform S916.

In some embodiments, the subsequent ambient light brightness value detection, human facial brightness detection, human face angle detection, and human facial organ state detection on the original image need to be completed based on the human facial key points and the segmentation of the human image and the background area. Therefore, whether the human facial key points can be detected and whether the human image can be effectively segmented are detected first. When the human facial key points can be detected and the human image segmentation in this step is effective, the subsequent S906, S907, S908 and S909 can be performed synchronously.

When detection of the human facial key points fails or the human image segmentation fails, the subsequence detection cannot be performed, that is, the identity photo cannot be generated based on the original image.

For the implementation of S902 to S905, reference may be made to S902, and details are not described again in this embodiment.

S906: Ambient light brightness value detection.

Due to the influence of ambient light during photographing, the image brightness may be deviated. When the brightness is too low or too high, the quality of the identity photo will be affected. Therefore, the ambient light brightness value detection is performed on the original image. In some embodiments, the ambient light brightness value detection may include S906a to S906e.

S906a: Extract image EXIF information and a background area.

In some embodiments, the image EXIF information and the image background area are obtained respectively, where the image background area may be obtained through the human image segmentation.

S906b: Determine ambient brightness according to the EXIF information.

S906d: Determine whether the ambient brightness is within a threshold range. If yes, it is determined that the ambient brightness passes the detection; or if not, perform S916.

S906c: Determine an image brightness situation according to background area brightness.

In some embodiments, the background area brightness may be determined according to a pixel value of each pixel point in the background area.

S906e: Determine whether the image brightness is within the threshold range. If yes, it is determined that the image brightness passes the detection; or if not, perform S916.

When the ambient brightness and the image brightness both pass the detection, it is determined that the ambient light brightness value detection is passed. If the image EXIF information cannot be extracted, whether the ambient light brightness value is satisfied can only be determined through the brightness of the background area.

In this step, S906b is simultaneously performed with S906c.

S907: Human facial brightness detection.

In order to further determine whether the image brightness meets the specification, in addition to detecting the ambient light brightness value, the human facial brightness in the image is also detected, and a detection process may include S907a to S907d.

S907a: Divide the human face area according to the human facial key points.

S907b: Calculate a basic facial brightness difference.

After the human face area is divided according to the human facial key points, the basic facial brightness difference corresponding to different division methods is determined based on the brightness of the different human face areas obtained by the different division methods.

S907c: Perform weighted calculation on a basic facial brightness difference result.

In some embodiments, after the basic facial brightness difference corresponding to the different division methods is obtained, the final human facial brightness difference is obtained based on performing weighted calculation on the weight corresponding to each division method.

S907d: Determine whether the human facial brightness difference is less than a specified threshold. If yes, it is determined that the human facial brightness detection is passed; or if not, perform S916.

In some embodiments, when the human facial brightness difference obtained based on the basic human facial brightness different is less than the specified threshold, it is determined that the human facial brightness meets the specification requirement.

S908: Human face angle detection.

During photographing, there may be a deviation between the human head and the preset head position of the identity photo, for example, the face is left or right, there is a bowing problem, or the like. Therefore, the face angle detection is used to determine whether there is an angle bias problem. In some embodiments, a human face angle detection process may include the following steps.

S908a: Perform orthographic projection on a standard facial key point.

In some embodiments, the angular deviation is determined based on the standard facial key points and the facial key points in the original image. In some embodiments, the standard facial key points in a three-dimensional space may be orthogonally projected to obtain position information on a two-dimensional plane, for example, the position information of the standard facial key points in an xy plane, an xz plane, and an yz plane may be obtained.

S908b: Perform space transformation and fitting projection on the current facial key point.

In some embodiments, after obtaining the position information of the standard facial key point, facial key point recognition is performed on the original image to obtain position information of the facial key point. Space transformation is performed on the position of the facial key point, and the position information of the standard facial key point is fitted. For example, coordinate fitting is performed in the xy plane, the xz plane, and the yz plane, respectively.

S908c: Determine a face angle.

In some embodiments, a human face angle may be determined based on coordinate transformation in a process of fitting human facial key point. In some embodiments, the human face angle may include a human face pitch angle (an angle that the human face rotates around an X axis), a human face yaw angle (an angle that the human face rotates around a Y axis) and a human face roll angle (an angle that the human face rotates around a Z axis).

S908d: Determine whether the human face angle is within an angle range. If yes, it is determined that the human face angle detection is passed; or if not, perform S916.

After obtaining the human face angle, whether each face angle is within the corresponding preset angle range is determined, and if all are within the preset angle range, it is determined that the face angle meets the specification.

S909: Facial organ state detection.

In addition to the possible angle deviation problem, the organs in the face may be blocked, such as the ears and eyes being blocked, or the opening and closing of the organs are irregular, such as the eyes are not opened. The detection includes the detection of the blocking state and the detection of the open and closed state, and the detection process may include S909a to S909e. S909a: Determine a facial organ location according to the facial key point.

S909b: Determine an organ open and closed state according to a facial key point distance.

S909d: Determine whether the open and closed state meets the requirement. If yes, it is determined that the organ open and closed state passes the detection; or if not, perform S916.

In some embodiments, whether the open and closed state of each organ meets the requirement may be determined according to the preset on and off degree of each organ. For example, different opening and closing ranges are preset for the eyes and mouth. When the opening and closing states of each organ meet the requirements, the opening and closing state is determined. meets requirements.

S909c: Determine an organ blocking state according to a facial key point confidence level S909d: Determine whether the blocking state meets the requirement. If yes, it is determined that the organ blocking state passes the detection; or if not, perform S916.

Correspondingly, when it is determined that none of the face organs is blocked, it is determined that the blocking state meets the requirements.

When the open and closed state and the occlusion state of the organ pass the detection, it is determined that the detection of the state of the face organ is passed. Wherein, step 909b and step 909c are executed synchronously.

When it is determined that ambient light brightness value detection, facial brightness detection, face angle detection, and facial organ state detection are passed, the following steps are performed.

For the specific processes of ambient light brightness value detection, facial brightness detection, face angle detection, and facial organ state detection, reference may be made to the foregoing step 503, which will not be repeated in this embodiment.

S910: Extract the local facial area according to the facial feature points.

S911: Determine whether the color deviation detection is passed. If yes, step 913 is performed, or if not, step 912 is performed.

Due to the environment or device parameters during photographing, the color of the image in the face area may have a color cast problem. Therefore, it is necessary to perform color deviation detection. In some embodiments, color deviation detection may be performed according to the extracted average pixel value of the partial face area, wherein, for the color deviation detection method, reference may be made to the foregoing step 904, which is not repeated in this embodiment.

S912: Color correction.

In this embodiment of the present application, when the color deviation detection is not passed, color correction can be performed automatically, wherein the correction process may include steps 912a to 912c.

S912a: Determine an average pixel value of the local face area.

S912b: Obtain a modification parameter according to a standard facial pixel value and
the average pixel value.

S912c: Perform color shift correction on the face area according to the modification parameter.

The process of the reverse training can be referred to step 505, which is not repeated in this embodiment.

S913: Replace the background area.

Different identity photos have different background colors. For example, the driver's license needs to be white, and the degree certificate needs to be blue. The photographing scene of the original image may not match the background requirements. Therefore, after the original image passes the above detection and correction, the background area is further checked. Perform detection, and replace the background area if it does not meet the requirements.

S914: Cropping correction.

Correspondingly, different identity photos also have different size requirements.

Therefore, it is necessary to further cut and correct the identity photos after background replacement to make their size meet the identity photos requirements.

S915: Output the identity photo.

In some embodiments, after cutting and correcting, an identity photo that meets the requirements can be obtained, and the computer device outputs the identity photo and displays it.

For specific implementation processes of step 913 to step 915, refer to step 907 to step 908, and details are not described herein again.

S916: Fail to generate an identity photo and display a failure reason

In some embodiments, in the above-mentioned facial key point recognition, portrait segmentation, and ambient light brightness value, facial brightness, face angle, or facial organ state detection process, if any of the detections fails, the generation of the identity photo fails, and the computer equipment fails. The corresponding failure reason will be displayed, and the user will be instructed to replace or take the original image that meets the specification, and then generate an identity photo that meets the specification.

Figure 10:
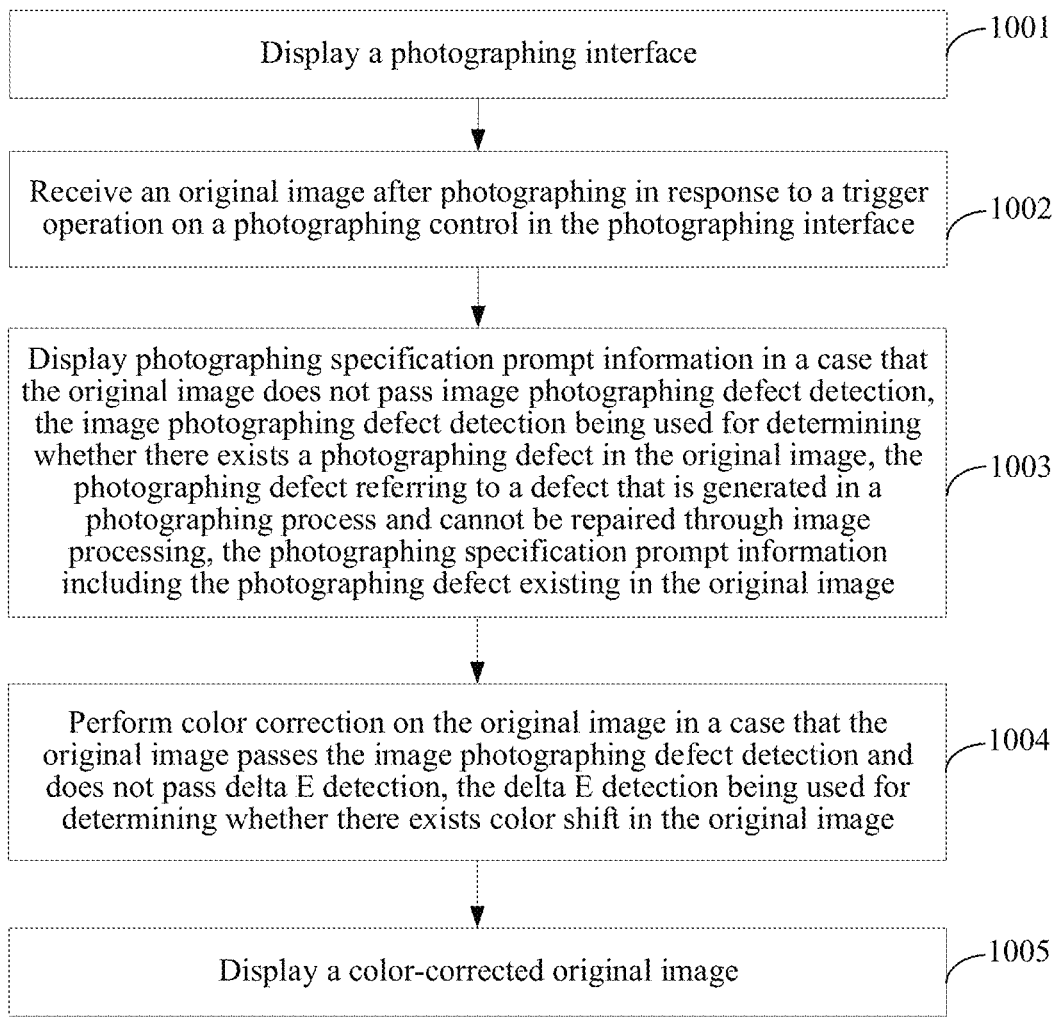
FIG. 10 is a flowchart of an image processing method according to another embodiment of this application.

FIG. 10 is a flowchart of an image processing method according to another embodiment of this application. In this embodiment, a description is made by using an example in which the method is applied to a computer device. The method includes the following steps:

Step 1001: Display a photographing interface.

In one possible application scenario, the original image may be an image photographed in real time When the user has a photographing demand, the photographing interface of the computer device can be opened to photograph the original image.

Take photographing an identity photo as an example. In some embodiments, when the user needs to photograph an identity card, an identity photo photographing interface may be opened, and when it is opened, the user may correspondingly select the type of identity photo, such as identity card, driver's license, or the like, or may further select a required size, such as one inch, two inches, or the like, and then enter the corresponding photographing interface. In another possible implementation, the user may further select a corresponding template to photograph after entering the identity photo photographing interface.

In some embodiments, a photographing control in the photographing interface may be located at the lower left, lower middle, lower right, or upper part of a touch screen, and may be in the form of a circle, a square, or the like, which is not limited in this embodiment of this application.

Figure 11:
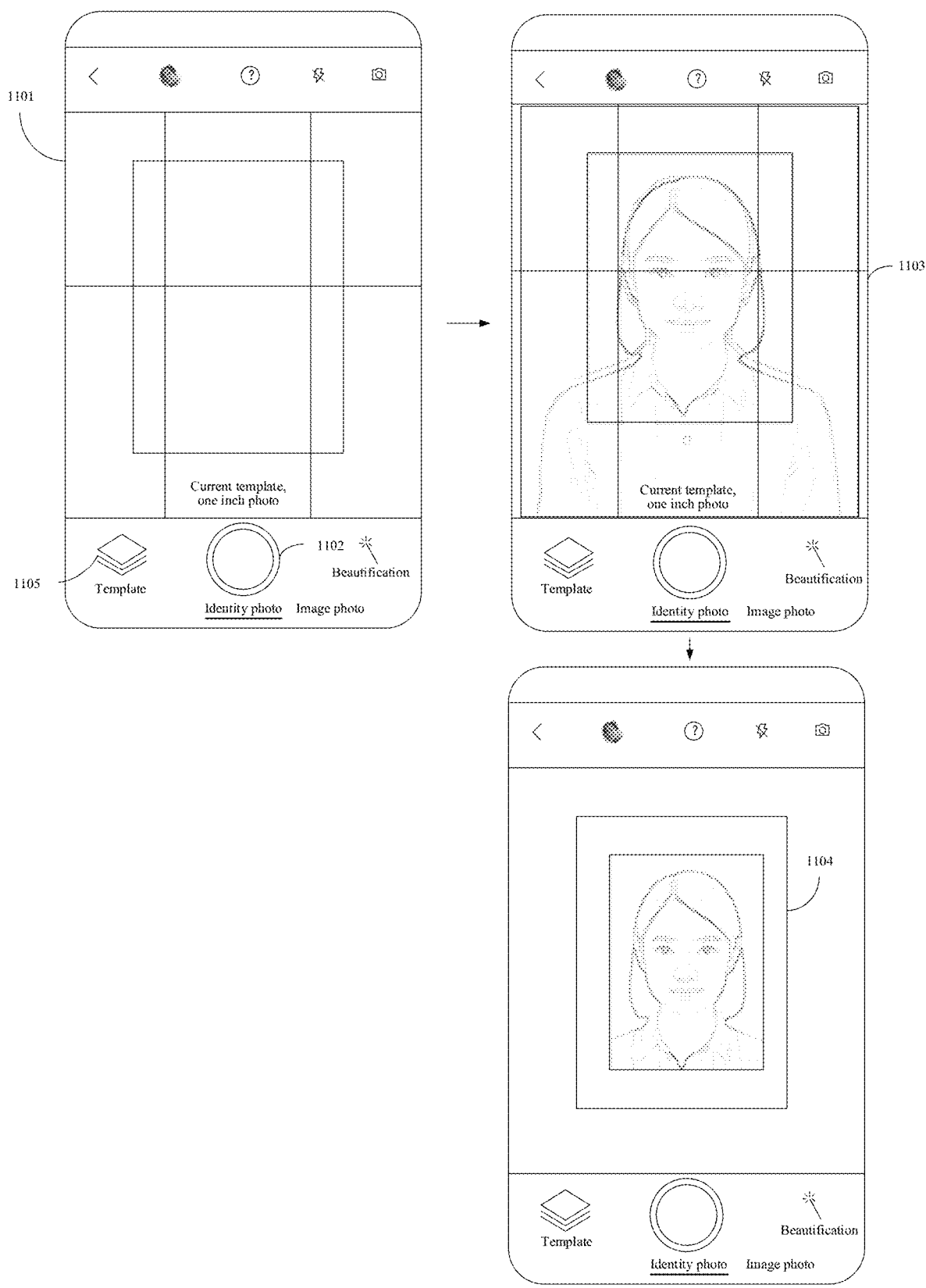
FIG. 11 is a schematic interface diagram of an identity photo generation process according to an embodiment of this application.

In some embodiments, as shown in FIG. 11, after the photographing interface is opened, an identity photo photographing interface 1101 is displayed, which includes a photographing control 1102 and a template selection control 1105. Changing the template to photograph may be selected through a trigger operation on a template selection control 1105.

In some embodiments, in the identity photo photographing interface, the original image may be selected from the photographed images stored in a local album; or the original image may be cropped from the photographed video stored in the local album; correspondingly, a control or interface for calling a local photo album or a local gallery is also displayed in the identity photo photographing interface.

S1002: Obtain an original image after photographing in response to a trigger operation on a photographing control in the photographing interface.

After the identity photo photographing interface (photographing interface) is displayed, identity photo photographing may be performed through the trigger operation on the photographing control. In some embodiments, the trigger operation on the photographing control includes at least one of clicking, long pressing, and sliding. Alternatively, the photographing of an identity photo may also be triggered by a voice, a gesture, or the like, which is not limited in this embodiment of the present application.

In some embodiments, as shown in FIG. 11, when receiving a trigger operation on the photographing control 1102, the computer device may obtain a photographed original image 1103 and generate an identity photo based on the original image 1103.

S1003: Display photographing specification prompt information when the original image does not pass image photographing defect detection, the image photographing defect detection being used for determining whether there exists a photographing defect in the original image, the photographing defect referring to a defect that is generated in a photographing process and irreparable through image processing, the photographing specification prompt information including the photographing defect existing in the original image.

After obtaining the photographed original image, the computer device will perform image photographing defect detection on the original image. When the computer device detects that the original image has a photographing defect that cannot be corrected by image processing, the computer device will obtain the reason for the detection failure and display corresponding photographing specification prompt information.

In some embodiments, the photographing specification prompt information includes items that do not meet the photographing specifications, that is, items of photographing defects existing in the original image, such as too high or too low brightness, occluded organs, and unsatisfactory posture. In addition, the photographing specification prompt information can also contain guidance information to guide the user to take an identity photo that meets the specification, such as please wear dark clothes, and straighten your head.

Figure 12:
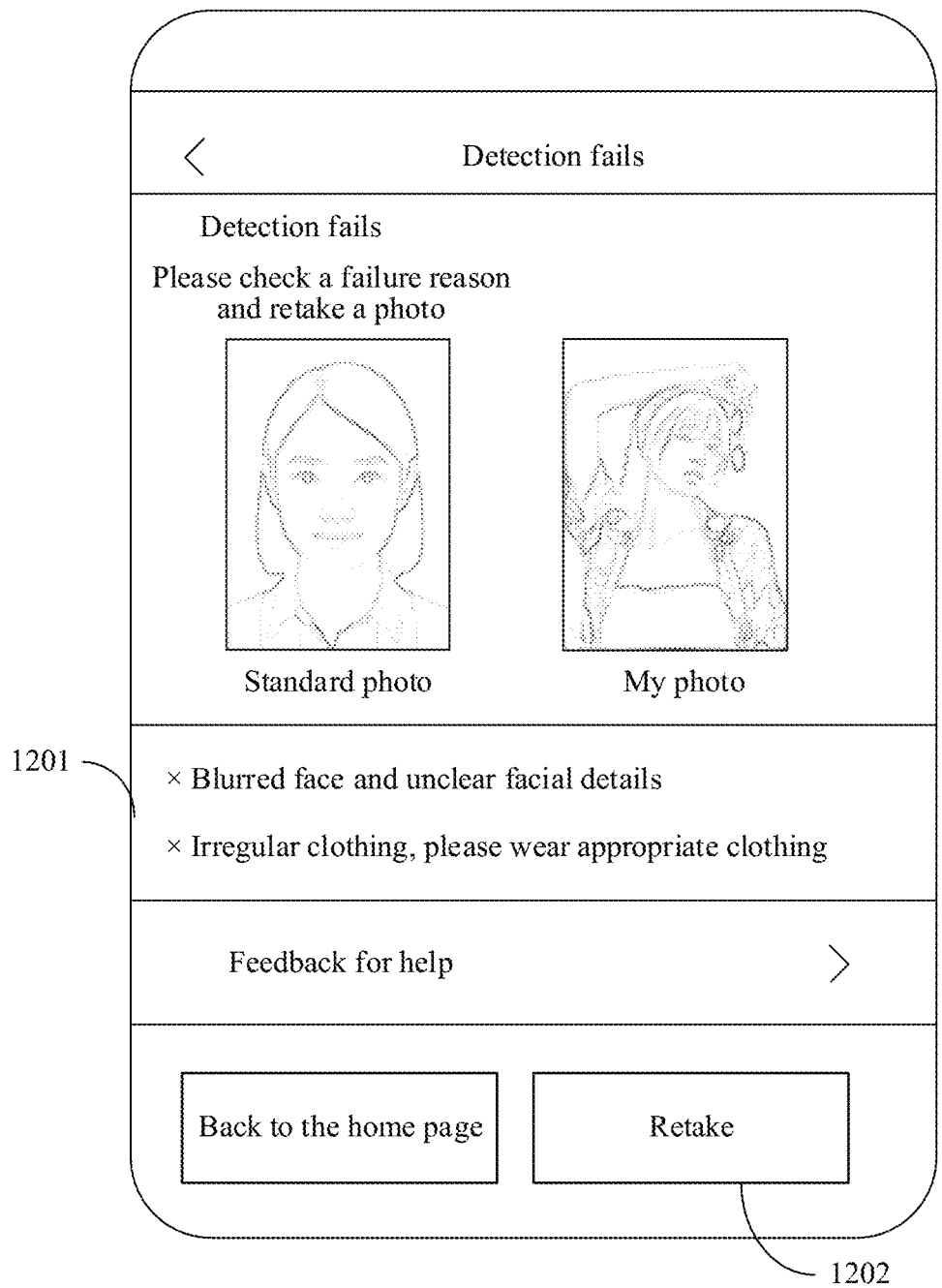
FIG. 12 is a schematic interface diagram of an identity photo generation failure according to an embodiment of this application.

In some embodiments, as shown in FIG. 12, the original image does not pass the image photographing defect detection, and the computer device displays that the detection fails, and displays a photographing specification prompt message 1201. In this case, the user may return to the identity photo photographing interface and take the identity photo again through a trigger operation on a retake control 1202.

S1004: Perform color correction on the original image when the original image passes the image photographing defect detection and does not pass color deviation detection, the color deviation detection being used for determining whether there exists color cast in the original image.

In some embodiments, after the image photographing defect detection is performed on the original image, the color deviation detection is performed on the original image. If there is a color cast problem in the original image, the color correction is performed on the original image.

In some embodiments, in the scenario of generating an identity photo, the color deviation detection may be focused to be performed on the biological face in the original image. If there is the color cast problem in the biological face in the original image, the color correction needs to be performed, so that the identity photo may be generated based on a color-corrected original image.

In this embodiment, the process of performing the image photographing defect detection and the color deviation detection on the original image by the computer device, and the process of performing the color correction on the biological face in the original image may refer to the foregoing embodiments, and details are not described herein again in this embodiment.

S1005: Display the color-corrected original image.

In some embodiments, after the color correction is performed on the original image, there is no photographing defect and color defect in the color-corrected original image, and the color-corrected original image may be displayed on a user interface for the user to check.

In some embodiments, in the scenario of generating the identity photo, after the color correction, if the background area of the original image does not meet the requirement of the identity photo or the size does not meet the requirement, the identity photo may be generated by replacing the background area or performing cropping correction.

As shown in FIG. 11, an identity photo 1104 is obtained and displayed after the image photographing defect detection and the color correction.

Figure 13:
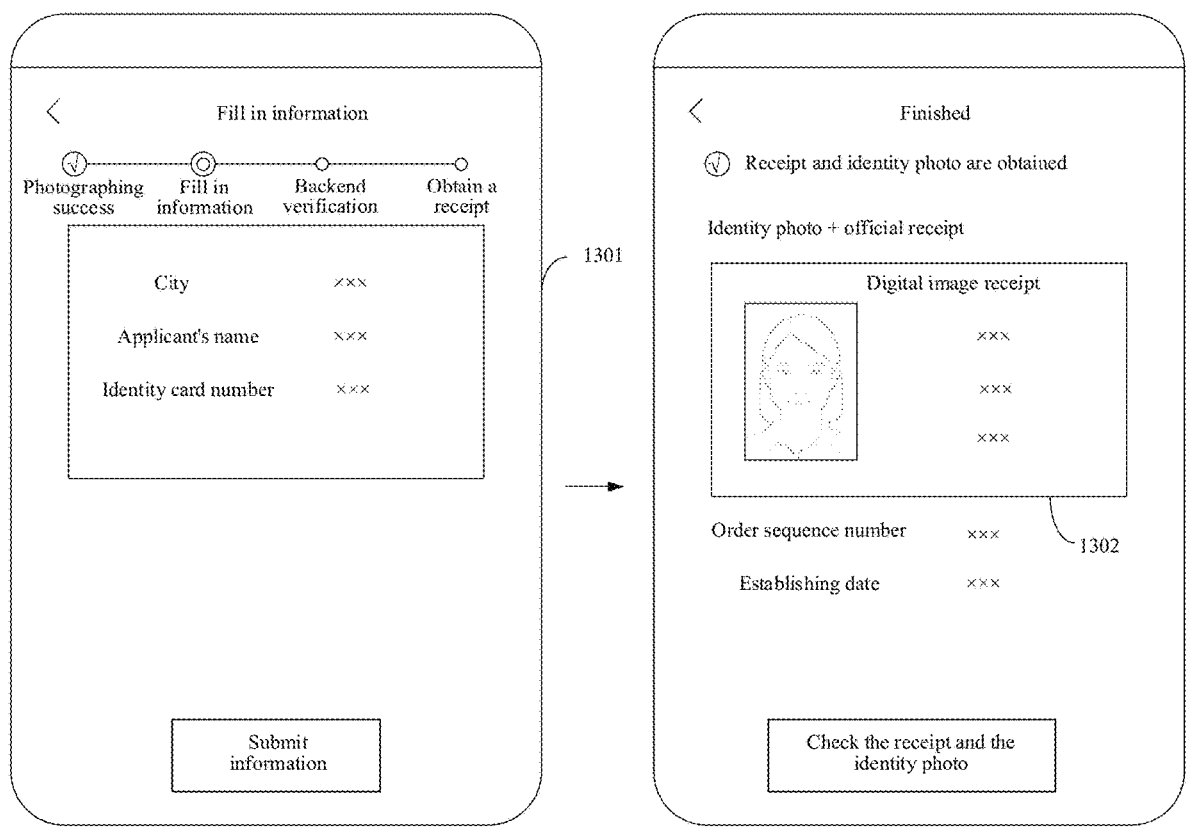
FIG. 13 is a schematic interface diagram of obtaining an identity photo receipt according to an embodiment of this application.

In some embodiments, after the identity photo is generated, an identity photo receipt may be further obtained. In some embodiments, as shown in FIG. 13, after the photographing succeeds, an information filling interface 1301 may be displayed, where personal data may be filled in to generate the identity photo receipt. After completing the information filling, a relevant department will perform verification, and the identity photo receipt 1302 may be obtained after the verification is completed.

In this embodiment, the process of performing the image photographing defect detection and the color cast detection on the original image by the computer device, and the process of performing the color correction on the biological face in the original image may refer to the foregoing embodiments, and details are not described herein again in this embodiment.

In conclusion, in this embodiment of this application, the user may take the identity photo in real time, and after the identity photo is taken, the computer device performs the image photographing defect detection, the color deviation detection and the color correction on the obtained image. The identity photo is generated based on the image that passes the detection and is color-corrected, which can improve the verification success rate of users taking the identity photo in any scenario, reduce labor costs, and improve identity photo photographing efficiency; in addition, performing the color correction on the original image that passes the image photographing defect detection and does not pass the color deviation detection can avoid an inefficient color correction process performed on the original image that does not pass the image photographing defect detection, thereby reducing a correction calculation amount of the computer device.

Figure 14:
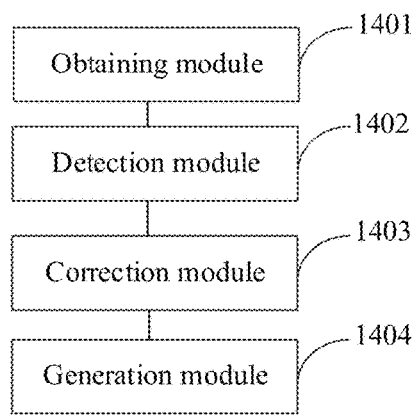
FIG. 14 is a structural block diagram of an image processing apparatus according to an embodiment of this application.

FIG. 14 is a structural block diagram of an image processing apparatus according to an embodiment of this application. As shown in the figure, the apparatus includes:
  an obtaining module 1401, configured to obtain an original image;
  a detection module 1402, configured to perform image photographing defect detection and color deviation detection on the original image, the image photographing defect detection being used for determining whether there exists a photographing defect in the original image, the photographing defect referring to a defect that is generated in a photographing process and irreparable through image processing, the color deviation detection being used for determining whether there exists color cast in the original image;
  a correction module 1403, configured to perform color correction on the original image when the original image passes the image photographing defect detection and does not pass the color deviation detection; and
  a generation module 1404, configured to generate a target image based on a color-corrected original image.

In some embodiments, the original image includes a biological face, and the color deviation detection is used for determining whether there exists the color cast in the biological face in the original image.

The correction module 1403 is further configured to:
perform the color correction on the biological face in the original image when the original image passes the image photographing defect detection and does not pass the color deviation detection; and
the generation module 1404 is further configured to:
generate an identity photo based on the color-corrected original image.

In some embodiments, the detection module 1402 is further configured to:
perform the image photographing defect detection on the original image, the image photographing defect detection including brightness detection and face feature detection, the brightness detection being used for determining whether there exists the photographing defect in brightness of the original image, the face feature detection being used for determining whether there exists the photographing defect in a face feature of the biological face in the original image; and
perform the color deviation detection on the biological face in the original image when the original image passes the image photographing defect detection.

In some embodiments, the detection module 1402 is further configured to:
determine ambient light brightness value and a facial brightness difference corresponding to the original image, the facial brightness difference being used for representing a brightness difference of different facial sub-areas; and
determine that the original image passes the brightness detection when the ambient light brightness value is within a brightness value range and the facial brightness difference is less than a brightness difference threshold.

In some embodiments, the detection module 1402 is further configured to:
obtain the ambient light brightness value from EXIF information of the original image, or, determine the ambient light brightness value based on a pixel value of a pixel point in a background image area in the original image;
divide the biological face in the original image into at least two facial sub-areas;
determine sub-area brightness of each of the facial sub-areas based on a pixel value of a pixel point in the facial sub-area; and
determine the facial brightness difference based on the sub-area brightness of each of the facial sub-areas.

In some embodiments, the detection module 1402 is further configured to:
divide the biological face in the original image into the at least two facial sub-areas through at least one division method; and
the determining the facial brightness difference based on the sub-area brightness of each of the facial sub-areas includes:
determining basic facial brightness differences corresponding to different division methods based on the sub-area brightness of each of the facial sub-areas; and
obtaining the facial brightness difference through weighted calculation based on the basic facial brightness differences and weights corresponding to a variety of the division methods.

In some embodiments, the detection module 1402 is further configured to:
determine a facial key point of the biological face in the original image;
determine a face angle and a facial organ state of the biological face in the original image based on the facial key point; and determine that the original image passes the face feature detection when the face angle is within an angle range and the facial organ state matches a target organ state.

In some embodiments, the detection module 1402 is further configured to:
  determine a facial organ blocking state based on a key point confidence level corresponding to the facial key point;
  determine a facial organ open and closed state based on a key point distance corresponding to the facial key point; and
  determine the facial organ blocking state and the facial organ open and closed state as the facial organ state, where
  when the facial organ state matches the target organ state, the facial organ blocking state indicates that a facial organ is not blocked, and the facial organ open and closed state indicates that the facial organ is in a target open and closed state.

In some embodiments, the detection module 1402 is further configured to:
  determine a target facial area of the biological face in the original image;
  determine an average pixel value of the target facial area based on a pixel value of a pixel point in the target facial area; and
  perform the color deviation detection based on the average pixel value.

In some embodiments, the average pixel value includes an average R value, an average G value, and an average B value.

In some embodiments, the detection module 1402 is further configured to:
  determine that the original image passes the color deviation detection when the average R value is greater than the average G value, the average G value is greater than the average B value, a ratio of the average R value to the average G value is within a first ratio interval, and a ratio of the average G value to the average B value is within a second ratio interval.

In some embodiments, the correction module 1403 is further configured to:
  determine a target standard pixel value corresponding to the average pixel value from a standard pixel value space, a standard pixel value in the standard pixel value space being an average pixel value of a pixel point in a facial area corresponding to a standard biological face, the standard biological face referring to a biological face without color deviation;
  determine a modification parameter corresponding to each color channel based on the average pixel value and the target standard pixel value; and
  perform pixel value modification on a pixel value of a pixel point in an area of the biological face in the original image by using the modification parameter corresponding to each color channel.

In some embodiments, the generation module 1404 is further configured to:
  obtain a background image area in the color-corrected original image;
  perform background replacement on the background image area when the background image area does not meet a background specification; and
  crop the original image after the background replacement to generate the identity photo.

In some embodiments, the apparatus further includes:
  a recognition module, configured to perform facial key point recognition and biological image segmentation on the original image.

In some embodiments, the detection module 1402 is further configured to:
  perform the image photographing defect detection and the color deviation detection on the original image when a facial key point is recognized and an biological image is segmented.

In conclusion, in the embodiments of this application, after obtaining the original image including the biological face, the image photographing defect detection and the color deviation detection are performed on the original image. On the one hand, whether there exists the photographing defect that is irreparable in the image can be detected through the image photographing defect detection, so that the user may be guided to perform appropriate photographing based on a detection result subsequently. On the other hand, whether there exists the color cast in the original image can be detected through the color deviation detection. If the color cast exists, the color correction is performed automatically, and the target image is generated based on the original image after the correction, which may improve a quality of the target image, thereby helping improve a verification success rate of the target image, and the automatic color correction can reduce learning costs of the user and help improve the verification success rate of an image photographed by the user in any scenario; in addition, performing the color correction on the original image that passes the image photographing defect detection and does not pass the color deviation detection can avoid an inefficient color correction process performed on the original image that does not pass the image photographing defect detection, thereby reducing a correction calculation amount of the computer device.

Figure 15:
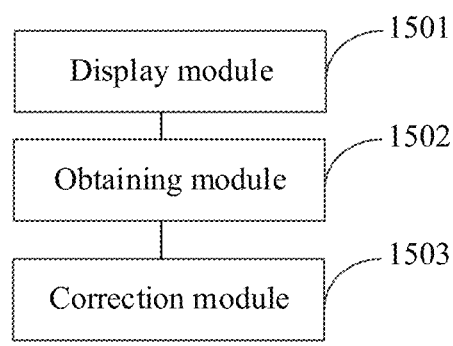
FIG. 15 is a structural block diagram of an image processing apparatus according to another embodiment of this application.

FIG. 15 is a structural block diagram of an image processing apparatus according to another embodiment of this application. As shown in the figure, the apparatus includes:
  a display module 1501, configured to display a photographing interface;
  an obtaining module 1502, configured to obtain an original image after photographing in response to a trigger operation on a photographing control in the photographing interface;
  the display module 1501 being further configured to display photographing specification prompt information when the original image does not pass image photographing defect detection, the image photographing defect detection being used for determining whether there exists a photographing defect in the original image, the photographing defect referring to a defect that is generated in a photographing process and irreparable through image processing, the photographing specification prompt information comprising the photographing defect existing in the original image;
  a correction module 1503, configured to perform color correction on the original image when the original image passes the image photographing defect detection and does not pass color deviation detection, the color deviation detection being used for determining whether there exists color cast in the original image; and
  the display module 1501 being further configured to display the color-corrected original image.

In conclusion, in the embodiment of this application, the user can take the identity photo in real time, and after the identity photo is taken, the computer device performs the image capture defect detection, the color deviation detection and the color correction on the obtained image. The identity photo is generated based on the image that passes the detection and is color-corrected, which can improve the verification success rate of users taking identity photos in any scenario, reduce labor costs, and improve identity photo photographing efficiency; in addition, performing the color correction on the original image that passes the image photographing defect detection and does not pass the color deviation detection can avoid an inefficient color correction process performed on the original image that does not pass the image photographing defect detection, thereby reducing a correction calculation amount of the computer device.

Figure 16:
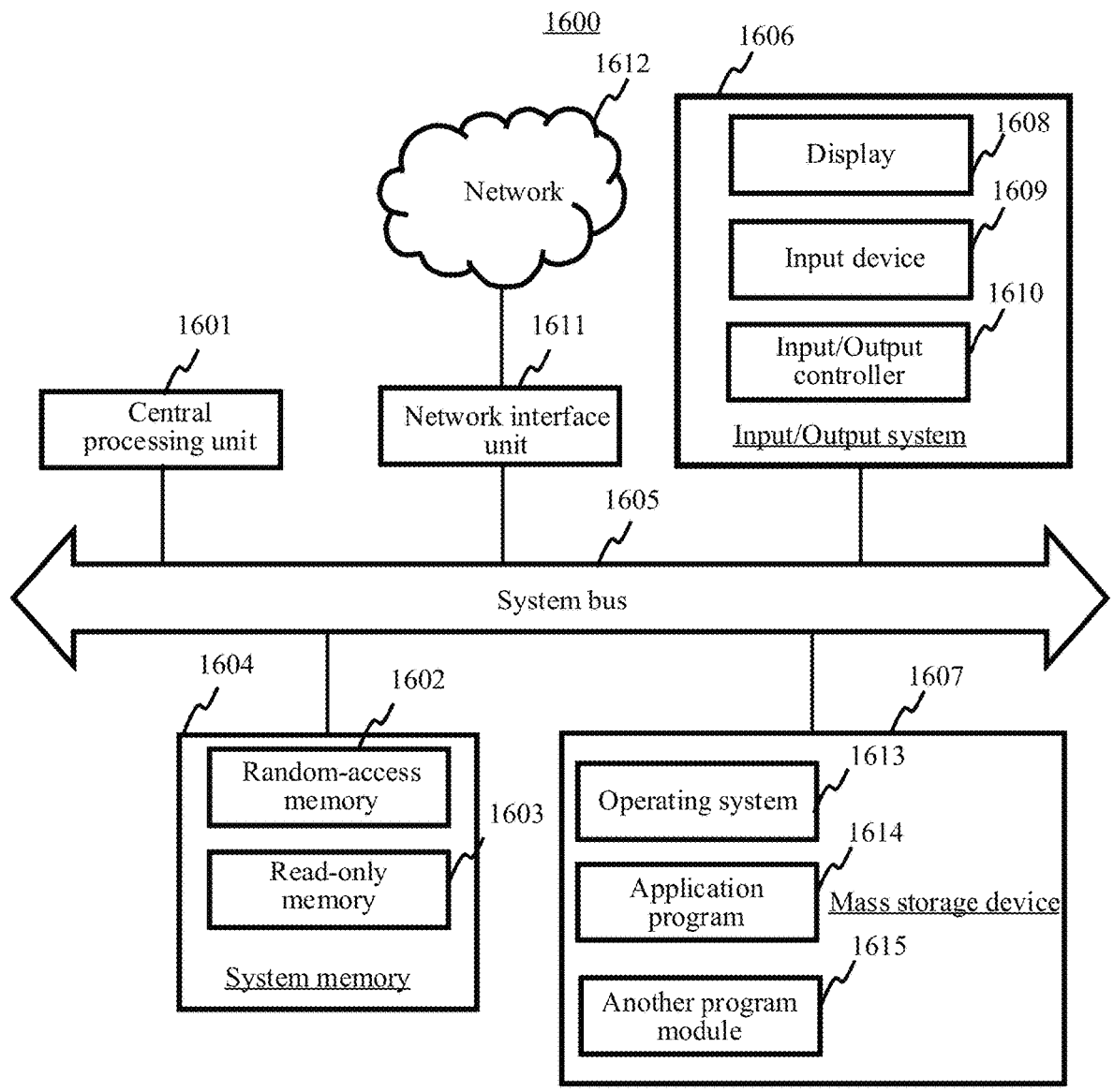
FIG. 16 is a structural block diagram of a computer device according to an embodiment of this application.

FIG. 16 is a schematic structural diagram of a computer device according to an embodiment of this application. Specifically: the computer device 1600 includes a central processing unit (CPU) 1601, a system memory 1604 including a random access memory 1602 and a read-only memory 1603, and a system bus 1605 connecting the system memory 1604 and the CPU 1601. The computer device 1600 further includes a basic input/output (I/O) system 1606 assisting in transmitting information between components in a computer, and a mass storage device 1607 configured to store an operating system 1613, an application program 1614, and another program module 1615.

The basic input/output system 1606 includes a display 1608 configured to display information and an input device 1609 such as a mouse and a keyboard for a user to input information. The display 1608 and the input device 1609 are both connected to the central processing unit 1601 through an input/output controller 1610 connected to the system bus 1605. The basic input/output system 1606 may further include the input/output controller 1610 for receiving and processing input from a plurality of other devices such as a keyboard, a mouse, an electronic stylus, or the like. Similarly, the input/output controller 1610 further provides output to a display screen, a printer, or other types of output devices.

The mass storage device 1607 is connected to the central processing unit 1601 through a mass storage controller (not shown) connected to the system bus 1605. The mass storage device 1607 and an associated computer-readable medium provide non-volatile storage for the computer device 1600. That is, the mass storage device 1607 may include a computer readable medium (not shown), such as a hard disk or a CD-ROM drive.

The foregoing system memory 1604 and mass storage device 1607 may be collectively referred to as a memory.

The memory stores one or more programs, and the one or more programs are configured to be executed by one or more CPUs 1601. The one or more programs include instructions used for implementing the foregoing method, and the CPU 1601 executes the one or more programs to implement the method provided in the foregoing method embodiments.

According to the embodiments of this application, the computer device 1600 may further be connected, through a network such as the Internet, to a remote computer on the network. That is, the computer device 1600 may be connected to a network 1612 by using a network interface unit 1611 connected to the system bus 1605, or may be connected to another type of network or a remote computer system (not shown) by using a network interface unit 1611.

The memory further includes one or more programs. The one or more programs are stored in the memory and comprise steps to be executed by the computer device in the method provided in the embodiments of this application.

An embodiment of this application further provides a computer-readable storage medium. The computer-readable storage medium stores at least one instruction, at least one program, a code set, or an instruction set. The at least one instruction, the at least one program, the code set, or the instruction set is loaded or executed by a processor to implement the image processing method according to any of the foregoing embodiments.

An embodiment of this application further provides a computer program product. The computer program product including computer instructions, the computer instructions being stored in a computer-readable storage medium. A processor of a computer device reads the computer instructions from the computer-readable storage medium, and executes the computer instructions, to cause the computer device to perform the image processing method according to the foregoing aspects.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium comprised in the memory in the foregoing embodiment, or may be a computer-readable storage medium that exists independently and that is not assembled in a terminal. The computer-readable storage medium stores at least one instruction, at least one program, a code set, or an instruction set. The at least one instruction, the at least one program, the code set, or the instruction set is loaded or executed by the processor to implement the image processing method according to any of the foregoing method embodiments.

In some embodiments, the computer-readable storage medium may include: a ROM, a RAM, a solid state drive (SSD), an optical disc, or the like. The RAM may include a resistive RAM (ReRAM) and a dynamic RAM (DRAM). The sequence numbers of the foregoing embodiments of this application are merely for description purpose, and do not indicate the preference among the embodiments.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. An image processing method, performed by a computer device and comprising:
receiving an original image, the original image comprising a face;
performing image photographing defect detection on the original image, the image photographing defect detection determining whether there exists a photographing defect that is irreparable through image processing, the image photographing defect detection comprising determining whether there exists the photographing defect in brightness of the original image and in a face feature of the face in the original image;
performing color deviation detection on the face in the original image when the image photographing defect detection does not identify the photographing defect, the color deviation detection determining whether there exists color cast in the original image;

performing color correction on the face in the original image if the original image passes the image photographing defect detection and does not pass the color deviation detection; and generating an identity photo based on the color-corrected original image.

2. The method according to claim 1, wherein the performing brightness detection on the original image comprises:

determining ambient light brightness value and a facial brightness difference corresponding to the original image, the facial brightness difference representing a brightness difference of different facial sub-areas; and determining that the original image passes the brightness detection when the ambient light brightness value is within a brightness value range and the facial brightness difference is less than a brightness difference threshold.

3. The method according to claim 2, wherein the determining ambient light brightness value and a facial brightness difference corresponding to the original image comprises:

obtaining the ambient light brightness value from exchangeable image file format (EXIF) information of the original image, or, determining the ambient light brightness value based on a pixel value of a pixel point in a background image area in the original image;

dividing the face in the original image into at least two facial sub-areas;

determining sub-area brightness value of each of the facial sub-areas based on a pixel value of a pixel point in the facial sub-area; and determining the facial brightness difference based on the sub-area brightness value of each of the facial sub-areas.

4. The method according to claim 3, wherein the dividing the face in the original image into at least two facial sub-areas comprises:

dividing the face in the original image into the at least two facial sub-areas by a division method; and the determining the facial brightness difference based on the sub-area brightness of each of the facial sub-areas comprises:

determining basic facial brightness differences corresponding to different division methods based on the sub-area brightness of each of the facial sub-areas; and obtaining the facial brightness difference through weighted calculation based on the basic facial brightness differences and weights corresponding to the division methods.

5. The method according to claim 1, wherein the performing face feature detection on the original image comprises:

determining a facial key point of the face in the original image;

determining a face angle and a facial organ state of the face in the original image based on the facial key point; and determining that the original image passes the face feature detection when the face angle is within an angle range and the facial organ state corresponds to a target organ state.

6. The method according to claim 5, wherein the determining a facial organ state of the face in the original image based on the facial key point comprises:

determining a facial organ blocking state based on a key point confidence level corresponding to the facial key point;

determining a facial organ open and closed state based on a key point distance corresponding to the facial key point; and determining the facial organ blocking state and the facial organ open and closed state as the facial organ state, wherein when the facial organ state corresponds to the target organ state, the facial organ blocking state indicates that a facial organ is not blocked, and the facial organ open and closed state indicates that the facial organ is in a target open and closed state.

7. The method according to claim 1, wherein the performing the color deviation detection on the face in the original image comprises:

determining a target facial area of the face in the original image;

determining an average pixel value of the target facial area based on a pixel value of a pixel point in the target facial area; and performing the color deviation detection based on the average pixel value.

8. The method according to claim 7, wherein the average pixel value comprises an average R value, an average G value, and an average B value; and the performing the color deviation detection based on the average pixel value comprises:

determining that the original image passes the color deviation detection when the average R value is greater than the average G value, the average G value is greater than the average B value, a ratio of the average R value to the average G value is within a first ratio interval, and a ratio of the average G value to the average B value is within a second ratio interval.

9. The method according to claim 7, wherein the performing color correction on the face in the original image comprises:

determining a target standard pixel value corresponding to the average pixel value from a standard pixel value space, a standard pixel value in the standard pixel value space being an average pixel value of a pixel point in a facial area corresponding to a standard face, the standard face referring to a face without color deviation;

determining a modification parameter corresponding to each color channel based on the average pixel value and the target standard pixel value; and performing pixel value modification on a pixel value of a pixel point in an area of the face in the original image by using the modification parameter corresponding to each color channel.

10. The method according to claim 1, wherein the generating an identity photo based on the color-corrected original image comprises:

obtaining a background image area in the color-corrected original image;

performing background replacement on the background image area when the background image area does not meet a background specification; and cropping the original image after the background replacement to generate the identity photo.

11. The method according to claim 1, wherein the method further comprises:

performing facial key point recognition and biological image segmentation on the original image; and the performing image photographing defect detection and color deviation detection on the original image comprises:

performing image photographing defect detection and color deviation detection on the original image when a facial key point is recognized and a biological image is segmented.

12. An image processing method, performed by a computer device and comprising:
- displaying a photographing interface;
- receiving an original image after photographing in response to a trigger operation on a photographing control in the photographing interface;
- displaying photographing specification prompt information when the original image does not pass image photographing defect detection, the image photographing defect detection determining whether there exists a photographing defect in the original image, the photographing defect referring to a defect that is irreparable through image processing, the photographing specification prompt information comprising the photographing defect existing in the original image;
- performing color correction on the original image when the original image passes the image photographing defect detection and does not pass a color deviation detection, the color deviation detection determining whether there exists color cast in the original image; and
- displaying the color-corrected original image after the color correction process.

13. A non-transitory computer-readable storage medium storing at least one instruction, at least one program, a code set, or an instruction set, the at least one instruction, the at least one program, the code set, or the instruction set being loaded and executed by a processor to implement:
- receiving an original image, the original image comprising a face;
- performing image photographing defect detection on the original image, the image photographing defect detection determining whether there exists a photographing defect that is irreparable through image processing, the image photographing defect detection comprising determining whether there exists the photographing defect in brightness of the original image and in a face feature of the face in the original image;
- performing color deviation detection on the face in the original image when the image photographing defect detection does not identify the photographing defect, the color deviation detection determining whether there exists color cast in the original image;
- performing color correction on the face in the original image if the original image passes the image photographing defect detection and does not pass the color deviation detection; and
- generating an identity photo based on the color-corrected original image.

14. The computer-readable storage medium according to claim 13, wherein the performing brightness detection on the original image comprises:
- determining ambient light brightness value and a facial brightness difference corresponding to the original image, the facial brightness difference representing a brightness difference of different facial sub-areas; and
- determining that the original image passes the brightness detection when the ambient light brightness value is within a brightness value range and the facial brightness difference is less than a brightness difference threshold.

15. The computer-readable storage medium according to claim 14, wherein the determining ambient light brightness value and a facial brightness difference corresponding to the original image comprises:
- obtaining the ambient light brightness value from exchangeable image file format (EXIF) information of the original image, or determining the ambient light brightness value based on a pixel value of a pixel point in a background image area in the original image;
- dividing the face in the original image into at least two facial sub-areas;
- determining sub-area brightness value of each of the facial sub-areas based on a pixel value of a pixel point in the facial sub-area; and
- determining the facial brightness difference based on the sub-area brightness value of each of the facial sub-areas.

16. The computer-readable storage medium according to claim 15, wherein the dividing the face in the original image into at least two facial sub-areas comprises:
- dividing the face in the original image into the at least two facial sub-areas by a division method; and
- the determining the facial brightness difference based on the sub-area brightness of each of the facial sub-areas comprises:
- determining basic facial brightness differences corresponding to different division methods based on the sub-area brightness of each of the facial sub-areas; and
- obtaining the facial brightness difference through weighted calculation based on the basic facial brightness differences and weights corresponding to the division methods.

* * * * *